United States Patent
Fukuta

(10) Patent No.: US 9,084,174 B2
(45) Date of Patent: Jul. 14, 2015

(54) RADIO COMMUNICATION SYSTEM, RADIO BASE STATION, AND HANDOVER CONTROL METHOD

(75) Inventor: Noriyoshi Fukuta, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 675 days.

(21) Appl. No.: 13/395,561

(22) PCT Filed: Sep. 10, 2010

(86) PCT No.: PCT/JP2010/065647
§ 371 (c)(1),
(2), (4) Date: Mar. 12, 2012

(87) PCT Pub. No.: WO2011/030862
PCT Pub. Date: Mar. 17, 2011

(65) Prior Publication Data
US 2012/0172045 A1    Jul. 5, 2012

(30) Foreign Application Priority Data

Sep. 11, 2009 (JP) .................................. 2009-210464
Jan. 26, 2010 (JP) .................................. 2010-014707

(51) Int. Cl.
H04W 36/00 (2009.01)
H04W 36/32 (2009.01)
H04W 84/00 (2009.01)

(52) U.S. Cl.
CPC ............ *H04W 36/32* (2013.01); *H04W 84/005* (2013.01)

(58) Field of Classification Search
USPC .......... 455/440, 436, 437, 438, 439, 441, 443
See application file for complete search history.

(56) References Cited

U.S. PATENT DOCUMENTS

| 2005/0227434 A1 | 10/2005 | Wu et al. |
| 2008/0227434 A1 | 9/2008 | Nitta et al. |
| 2009/0104911 A1* | 4/2009 | Watanabe et al. ............. 455/436 |
| 2009/0239467 A1* | 9/2009 | Gulin et al. ................. 455/41.2 |

FOREIGN PATENT DOCUMENTS

| JP | 2004-159304 A1 | 6/2006 |
| WO | 2006-100714 A1 | 9/2006 |

OTHER PUBLICATIONS

3GPP TR 36.814 V0.4.1 (Feb. 2009) Technical Report; 3rd Generation Partnership Project; Technical Specification Group Radio Access Network; Further Advancements for E-UTRA Physical Layer Aspects (Release 9).

* cited by examiner

Primary Examiner — Justin Lee
(74) Attorney, Agent, or Firm — Studebaker & Brackett PC

(57) ABSTRACT

A radio communication system wherein a radio terminal (200A) and a relay node (300A) are connected to a radio base station (100A), and at least one of the radio terminal (200A) and relay node (300A) can move. The radio base station (100A) controls a handover that is an operation of the radio terminal (200A) to change the connection destination thereof. The radio base station (100A) controls the handover from the radio base station (100A) to the relay node (300A) on the basis of whether a predetermined condition, which indicates that the change in relative distance between the radio terminal (200A) and the relay node (300A) is kept null or small, is satisfied or not.

9 Claims, 16 Drawing Sheets

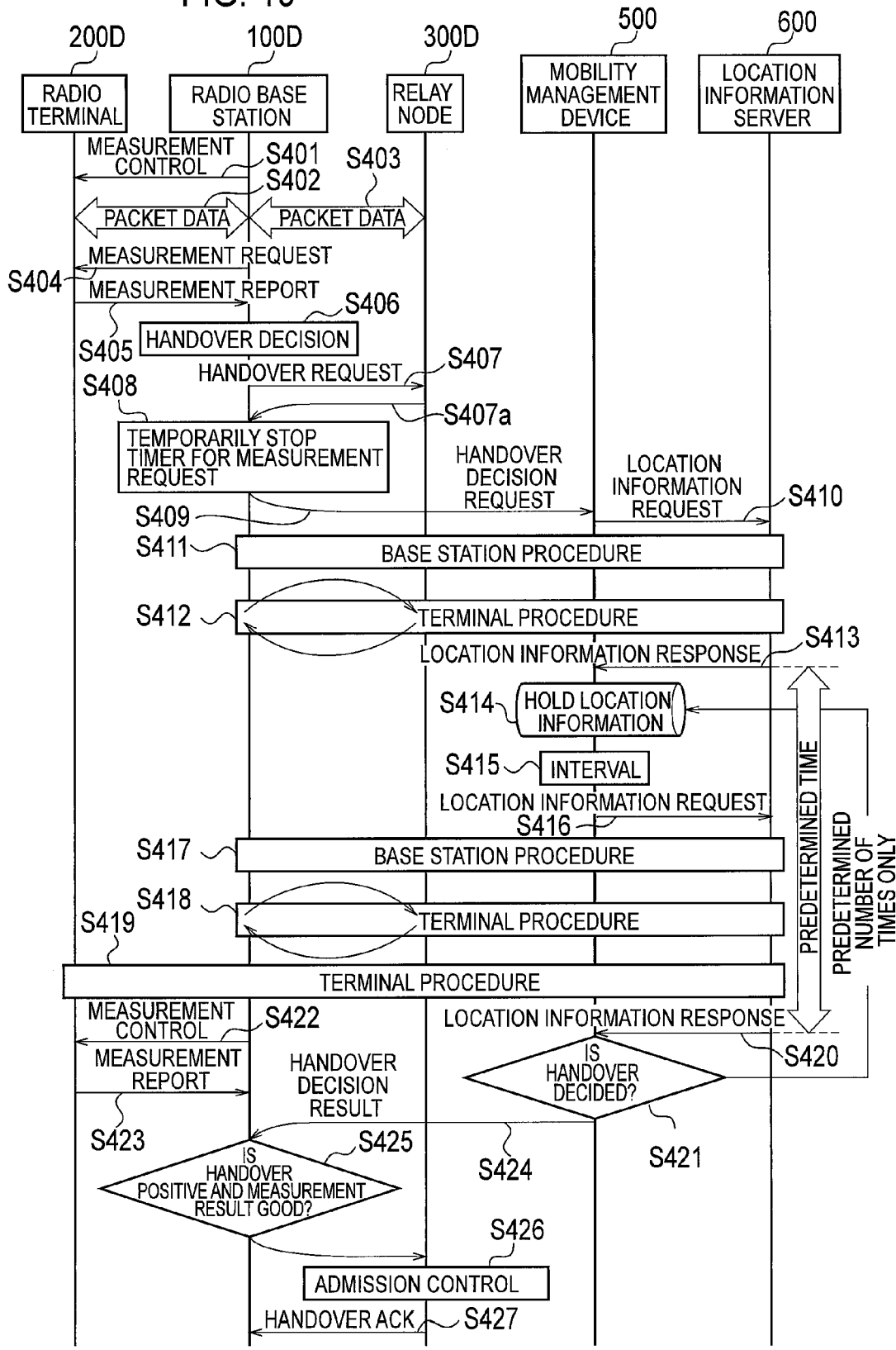

_(1)_

RADIO COMMUNICATION SYSTEM, RADIO BASE STATION, AND HANDOVER CONTROL METHOD

TECHNICAL FIELD

The present invention relates to a radio communication system to which a relay transmission is applied, a radio base station, and a handover control method.

BACKGROUND ART

As the next-generation radio communication system for performing a higher speed communication as compared with the 3rd-generation and 3.5th-generation radio communication systems operated at present, LTE (Long Term Evolution) has been standardized in 3GPP (3rd Generation Partnership Project) which is the standardization body of a radio communication system.

The technical specifications of the LTE have been specified as 3GPP Release 8, and Release 9 which is an upgrade version of Release 8, and LTE Advanced which is a sophisticated version of the LTE, have been currently considered. In LTE Advanced, the adoption of relay transmission using a fixable or movable radio relay station called a relay node is planned (for example, see Non-Patent Document 1).

The radio relay station is a low-output relay base station connected to the radio base station (macro base station) via radio. The radio terminal connected to the radio relay station performs communication with the radio base station via the radio relay station. When the radio relay station is installed in transportation equipment such as a train or a bus and then the radio terminal present inside the transportation equipment is connected to the radio relay station, it is possible to perform communication under better conditions as compared to when a connection is established with the radio base station.

Furthermore, the radio terminal performs a handover in which the connection destinations are switched to a radio base station having a radio quality better than the currently-connected radio base station. The radio terminal can perform a handover not only between the radio base stations but also from the radio base station to the radio relay station. In such a case, the radio terminal performs a handover to a radio relay station having a radio quality better than the currently-connected radio base station.

PRIOR ART DOCUMENT

Non-Patent Document

Non-Patent Document 1: 3GPP TR 36.814 V0.4.1, Chapter 9 "Relaying functionality", February 2009

SUMMARY OF THE INVENTION

A radio signal transmitted by the radio relay station installed in the transportation equipment reaches even outside the transportation equipment. Therefore, according to a conventional method, even for a radio terminal connected to the radio base station outside the transportation equipment, if the radio quality of the radio signal received from the radio relay station is good, the radio relay station becomes a candidate of a handover destination of the radio terminal.

When the radio terminal outside the transportation equipment performs a handover to the radio relay station installed in the transportation equipment, because the communication area formed by the radio relay station is small, the radio terminal must perform a handover from the radio relay station to the radio base station if the radio terminal or the radio relay station moves.

Therefore, it becomes necessary to perform a handover from the radio relay station to the radio base station immediately after performing a handover from the radio base station to the radio relay station, and as a result, the handover from the radio base station to the radio relay station becomes useless in most cases. The conventional method thus poses a problem of occurrence of a process load and communication delay due to useless handover.

Thus, an object of the present invention is to provide a radio communication system, a radio base station, and a handover control method, by which it is possible to prevent the occurrence of a process load and communication delay due to useless handover, when a radio relay station is used.

The present invention has the following features to solve the problems described above. First of all, a feature of a radio communication system according to the present invention is summarized as a radio communication system configured such that a radio terminal (e.g. radio terminal 200A, radio terminal 200B, radio terminal 200C, or radio terminal 200D) and a radio relay station (relay node 300A, relay node 300B, relay node 300C, or relay node 300D) are connected to a radio base station (radio base station 100A, radio base station 100B, radio base station 100C, or radio base station 100D) and at least one of the radio terminal and the radio relay station is movable, the system comprising: a handover controller (handover controller 124) configured to control a handover which is an operation in which the radio terminal switches a connection destination, wherein the handover controller controls the handover from the radio base station to the radio relay station based on whether or not a predetermined condition is satisfied, wherein the predetermined condition indicates that a state where a change in a relative distance between the radio terminal and the radio relay station either does not exist or is small is maintained.

According to such a feature, based on whether or not a predetermined condition indicating that a state where a change in a relative distance between the radio terminal and the radio relay station either does not exist or is small is maintained is satisfied, a handover from the radio base station to the radio relay station is controlled. Thus, it becomes possible to realize a control in which a handover from the radio base station to the radio relay station is allowed in a case that the state where a change in a relative distance between the radio terminal and the radio relay station either does not exist or is small is maintained, and also to realize a control in which a handover from the radio base station to the radio relay station is prohibited in a case that the state where a change in a relative distance between the radio terminal and the radio relay station either does not exist or is small is not maintained. Therefore, in a case where a radio relay station is used, the occurrence of a process load and communication delay due to a useless handover can be prevented.

In the aforementioned feature, the handover controller may control such that the radio terminal executes the handover from the radio base station to the radio relay station when the predetermined condition is satisfied.

In the aforementioned feature, the handover controller may control such that the radio terminal executes the handover from the radio base station to the radio relay station when the level of a radio quality between the radio terminal and the radio relay station is higher than a predetermined level and the predetermined condition is satisfied.

In the aforementioned feature, the handover controller may control such that the radio terminal does not execute the handover from the radio base station to the radio relay station when the predetermined condition is not satisfied.

In the aforementioned feature, the handover controller may control such that the handover from the radio base station to the radio relay station is not executed when the level of a radio quality between the radio terminal and the radio relay station is higher than a predetermined level, but the predetermined condition is not satisfied.

In the aforementioned feature, the predetermined condition may be a condition where a first value indicating an amount of change in the relative distance over a predetermined time period is equal to or less than a threshold value.

In the aforementioned feature, the radio communication system may further comprise: an acquisition unit (e.g. information acquisition unit 121) configured to acquire first terminal location information indicating a location of the radio terminal at a first time; second terminal location information indicating a location of the radio terminal at a second time after the lapse of a predetermined time period from the first time; first relay station location information indicating a location of the radio relay station at the first time; and second relay station location information indicating a location of the radio relay station at the second time, and a first calculator (e.g. relative distance calculator 123) configured to calculate a first relative distance based on the first terminal location information and the first relay station location information and a second relative distance based on the second terminal location information and the second relay station location information, and to calculate a value indicating a difference between the calculated first relative distance and the calculated second relative distance as the first value.

In the aforementioned feature, the radio communication system may further comprise: a second calculator (e.g. moved distance calculator 122) configured to calculate a second value indicating a moved distance of the radio terminal over the predetermined time period based on the first terminal location information and the second terminal location information, and to calculate a third value indicating a moved distance of the radio relay station over the predetermined time period based on the first relay station location information and the second relay station location information, wherein the first calculator calculates the first value when at least one of the second value and the third value is more than zero.

In the aforementioned feature, the radio communication system may further comprise: an acquisition unit (e.g. information acquisition unit 521) configured to acquire terminal location information indicating a location of the radio terminal at a second time after the lapse of the predetermined time period from the first time when the level of the radio quality between the radio terminal and the radio relay station is in a state where the radio terminal can connect to the radio relay station, and relay station location information indicating a location of the radio relay station at the second time, and a first calculator (e.g. relative distance calculator 523) configured to calculate a relative distance between a location shown by the terminal location information and a location shown by the relay station location information as the first value by assuming that the relative distance between the radio terminal and the radio relay station at the first time is zero.

In the aforementioned feature, the radio communication system may further comprise: a second calculator (e.g. moved-distance calculator 522) configured to calculate a value indicating a moved-distance of the radio relay station over the predetermined time period based on the first relay station location information indicating a location of the radio relay station at the first time and the second relay station location information indicating a location of the radio relay station at the second time, wherein the first calculator calculates the first value when the value calculated by the second calculator is more than zero.

In the aforementioned feature, the acquisition unit and the first calculator may be provided in the radio base station or an upper level device (e.g. mobility management device 500) of the radio base station.

In the aforementioned feature, the radio terminal may have a first location measurement unit (location measurement unit 232) configured to measure a location of the radio terminal, the radio relay station may have a second location measurement unit (location measurement unit 341) configured to measure a location of the radio relay station, and when the level of the radio quality between the radio terminal and the radio relay station is higher than a predetermined level, the handover controller may transmit a location information request requesting the transmission of information about the location measurement result to the radio terminal and the radio relay station.

In the aforementioned feature, the radio relay station may be installed in transportation equipment (e.g. transportation equipment T) that a user of the radio terminal can board, the radio relay station or the transportation equipment may have a first communication unit (e.g. near field radio communication unit 360 or non-contact IC card communication unit 400) configured to perform communication conforming to a predetermined communication scheme, the radio terminal may have a second communication unit (near field radio communication unit 260 or non-contact IC card unit 270) configured to perform communication conforming to a predetermined communication scheme, and the predetermined condition may be a condition where a connection is established between the first communication unit and the second communication unit.

In the aforementioned feature, the predetermined communication scheme may be a communication scheme having a communication distance such that communication can be performed only in the transportation equipment.

In the aforementioned feature, the predetermined communication scheme may be the near field radio communication scheme or the non-contact IC card communication scheme.

A feature of a radio base station according to the present invention is summarized as a radio base station (radio base station 100A, radio base station 100B, radio base station 100C, or radio base station 100D) to which a radio terminal (e.g. radio terminal 200A, radio terminal 200B, or radio terminal 200C) and a radio relay station (relay node 300A, relay node 300B, or relay node 300C) are connected, at least one of the radio terminal and the radio relay station being movable, the radio base station comprising: a handover controller (handover controller 124) configured to control a handover which is an operation in which the radio terminal switches a connection destination, wherein the handover controller controls the handover from the radio base station to the radio relay station based on whether or not a predetermined condition is satisfied, wherein the predetermined condition indicates that a state where a change in a relative distance between the radio terminal and the radio relay station either does not exist or is small is maintained.

A feature of a handover control method according to the present invention is summarized as a handover control method for controlling a handover that is an operation in which a radio terminal switches connection destinations, in a radio communication system configured such that a radio terminal and a radio relay station are connected to a radio base station and at least one of the radio terminal and the radio relay station is movable, the method comprising: a step of controlling the handover from the radio base station to the radio relay station based on whether or not a predetermined condition is satisfied, wherein the predetermined condition indicates that a state where a change in a relative distance between the radio terminal and the radio relay station either does not exist or is small is maintained.

According to the present invention, it is possible to provide a radio communication system, a radio base station, and a handover control method, by which it is possible to prevent the occurrence of a process load and communication delay due to useless handover, in a case where a radio relay station is used.

BRIEF DESCRIPTION OF THE DRAWINGS

FIG. 19 is an operation sequence chart illustrating a detailed operation example of the radio communication system according to the third embodiment of the present invention.

DESCRIPTION OF THE EMBODIMENTS

Figure 1:
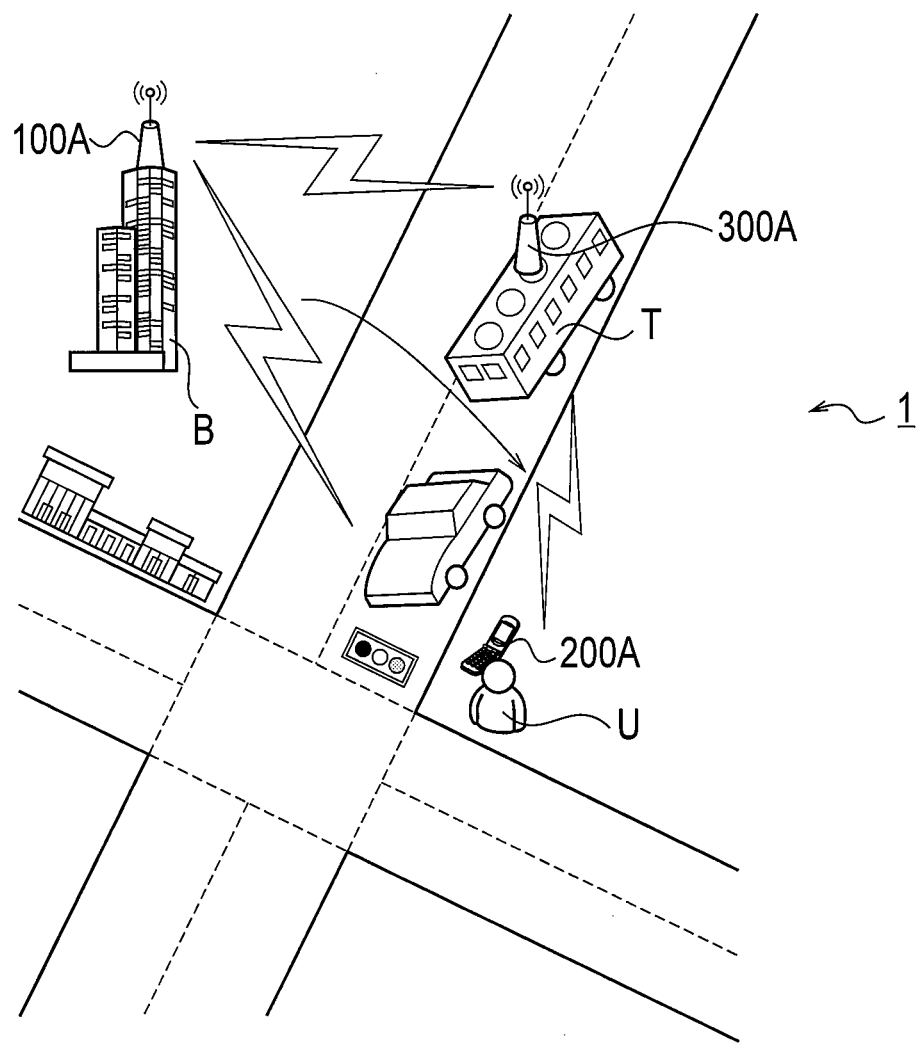
FIG. 1 is a diagram illustrating the configuration of a radio communication system according to a first embodiment of the present invention.

Hereinafter, a first embodiment, a second embodiment, a third embodiment, and other embodiments of the present invention are explained. In all drawings for explaining the following embodiments, the same or similar reference numerals are used to designate the same or similar elements.

First Embodiment

In the first embodiment, (1) Configuration of radio communication system, (2) Operation of radio communication system, and (3) Operation and effect of first embodiment are explained in this order.

(1) Configuration of Radio Communication System

First of all, the configuration of a radio communication system according to the first embodiment is explained in the order of (1.1) Entire configuration of radio communication system and (1.2) Detailed configuration of radio communication system.

(1.1) Entire Configuration of Radio Communication System

FIG. 1 is a diagram illustrating the configuration of a radio communication system 1 according to the first embodiment. The radio communication system 1 has a radio base station 100A, a radio terminal 200A, and a relay node 300A (a radio relay station). The radio communication system 1, for example, is configured based on LTE-Advanced which is positioned as a 4th-generation (4G) cellular phone system.

The radio base station 100A, for example, is a macro base station forming a cell having a radius of about several hundreds of meters. The cell formed by the radio base station 100A is a communication area that can be connected to the radio base station 100A. In the example of FIG. 1, the radio base station 100A is installed in a building B, and cannot be moved.

The radio base station 100A is connected to a backhaul network not shown in the figure. The backhaul network is a wired communication network, and the radio base station 100A can perform communication between base stations with another radio base station via the backhaul network.

The radio terminal 200A and the relay node 300A are positioned within the cell formed by the radio base station 100A. The radio terminal 200A and the relay node 300A are connected to the radio base station 100A via radio.

The radio terminal 200A is possessed by a user U and moves as a result of a movement of the user U. The radio terminal 200A may be a cellular phone terminal, or may be a card-type communication terminal. The radio terminal 200A connects to the radio base station 100A and performs direct radio communication with the radio base station 100A. The radio terminal 200A performs a handover which is an operation of switching connection destinations. The radio terminal 200A can perform a handover not only from one radio base station to another radio base station, but also from a radio base station to a relay node.

The radio terminal 200A includes a system, such as GPS (Global Positioning System), which enables the acquisition of the own location information (hereinafter, a positioning system). In the first embodiment, the radio terminal 200A has a GPS receiver 220 (see FIG. 2) configured to receive a signal from a GPS satellite.

The radio terminal 200A measures a radio quality of the radio signal to be received. The received signal strength indicator (RSSI) of a reference signal transmitted periodically, or the carrier to interference and noise ratio (CINR) of the reference signal is used as the radio quality. The radio terminal 200A measures not only the radio quality of the radio signal to be received from the radio base station 100A of the connection destination, but the radio quality of the radio signals that can be received.

The radio terminal 200A periodically measures the radio quality. Alternatively, the radio terminal 200A may measure the radio quality when the level of the radio quality between the radio terminal and the radio base station 100A of the connection destination falls below a predetermined level.

The radio signal that the radio terminal 200A receives includes an identifier (cell ID) for identifying the transmission source of the radio signal. The radio terminal 200A reports the measurement result of the radio quality, together with the cell ID, to the radio base station 100A. Such a report is called a measurement report in LTE.

The relay node 300A is installed in transportation equipment T, and moves as a result of a movement of the transportation equipment T. In FIG. 1, a bus is provided as an example of the transportation equipment T. The relay node 300A is connected to the radio base station 100A via radio, and is a low-output relay base station having a radio backhaul. When the radio terminal 200A is connected to the relay node 300A, the relay node 300A relays the communication between the radio terminal 200A and the radio base station 100A. That is, when the radio terminal 200A is connected to the relay node 300A, it communicates indirectly with the radio base station 100A via the relay node 300A.

The relay node 300A includes a positioning system. In the first embodiment, the relay node 300A has a GPS receiver 330 (see FIG. 3) configured to receive a signal from a GPS satellite.

The radio base station 100A has a determination right of a handover concerning the radio terminal 200A that connects to the radio base station 100A. When the radio terminal 200A receives a command for a handover from the radio base station 100A, the radio terminal 200A performs a handover to the handover destination specified by the radio base station 100A.

Figure 10:
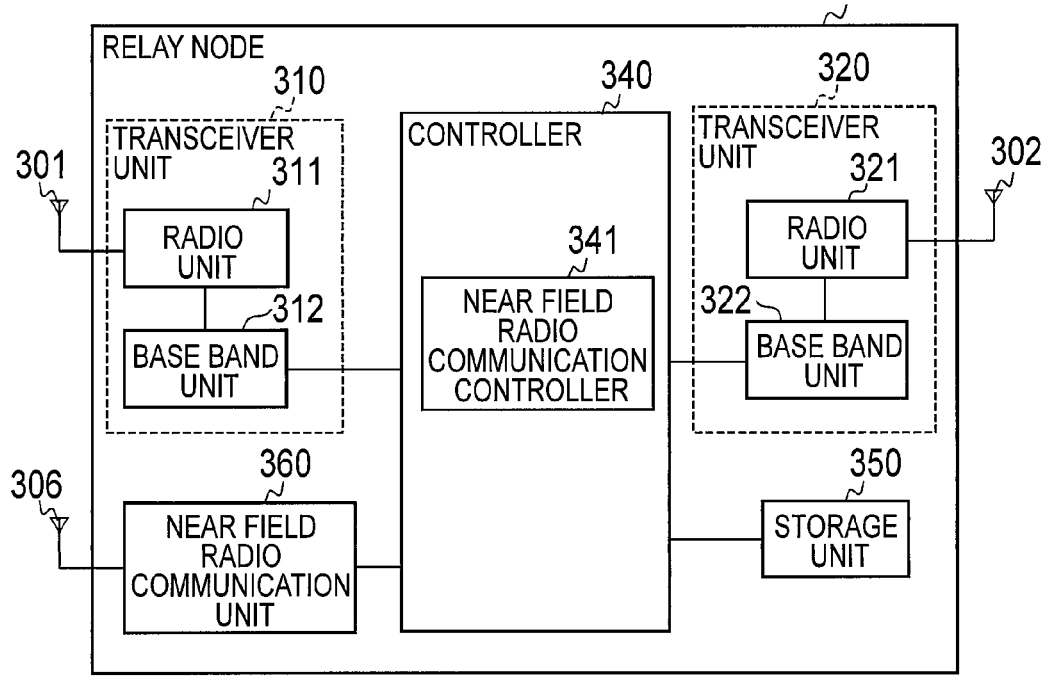
FIG. 10 is a block diagram illustrating the configuration of a relay node (a radio relay station) according to the second embodiment of the present invention.

Specifically, the radio base station 100A acquires a radio status of the radio terminal 200A based on the measurement report received from the radio terminal 200A, and if a handover to another radio base station is necessary, the radio base station 100A transmits a handover request via the backhaul network to the radio base station that acts as a candidate of the handover destination. Thus, the radio base station 100A receives a response from the radio base station of the handover-destination candidate, and if the radio base station of the handover-destination candidate can accept the radio terminal 200A, the radio base station 100A transmits a handover command to the radio terminal 200A. After disconnecting the connection with the radio base station 100A, the radio terminal 200A connects to the radio base station of the handover destination, and thus completes the handover. For details on such a procedure, for example, see 3GPP TS 36.300: "Evolved Universal Terrestrial Radio Access (E-UTRA) and Evolved Universal Terrestrial Radio Access Network (E-UTRAN); Overall description": Figure 10.1.2.1.1-1 Intra-MME/Serving Gateway HO.

Furthermore, the radio base station 100A acquires a radio status of the radio terminal 200A based on the measurement report received from the radio terminal 200A, and if a handover to the relay node 300A is necessary, the radio base station 100A transmits a handover request to the relay node 300A that acts as a candidate of the handover destination. Thus, the radio base station 100A receives a response from the relay node 300A of the handover-destination candidate, and if the relay node 300A of the handover-destination candidate can accept the radio terminal 200A, the radio base station 100A transmits a handover command to the radio terminal 200A. After disconnecting the connection with the radio base station 100A, the radio terminal 200A connects to the relay node 300A of the handover destination, and thus completes the handover.

A radio signal transmitted by the relay node 300A installed in the transportation equipment T reaches even outside the transportation equipment T. Therefore, if the level of the radio quality of the radio signal received from the relay node 300A in the radio terminal 200A connected to the radio base station 100A outside the transportation equipment T is equal to or more than a predetermined level, the relay node 300A becomes a candidate of the handover destination of the radio terminal 200.

Specifically, if the level of the radio quality of the radio signal that the radio terminal 200A receives from the relay node 300A is equal to or more than the level of the radio quality of the radio signal that the radio terminal 200A receives from the radio base station 100A, the relay node 300A becomes a candidate of the handover destination of the radio terminal 200A.

When the radio terminal 200A performs a handover to the relay node 300A installed in the transportation equipment T, because the communication area formed by the relay node 300A is small, the radio terminal 200A must perform a handover from the relay node 300A to the radio base station 100A if the radio terminal 200A or the relay node 300A moves.

In the example of FIG. 1, when the radio terminal 200A is positioned in a periphery of the transportation equipment T that has stopped while awaiting a signal, and the radio terminal 200A performs a handover from the radio base station 100A to the relay node 300A, then if the transportation equipment T resumes the movement, the radio terminal 200A must perform a handover from the relay node 300A to the radio base station 100A. As a result, the handover from the radio base station 100A to the relay node 300A becomes useless.

On the other hand, when the radio terminal 200A exists in the transportation equipment T and moves as a result of a movement of the transportation equipment T, then by connecting to the relay node 300A, the radio terminal 200A can perform communication with the radio base station 100A under better conditions as compared to when a connection is established with the radio base station 100A. Specifically, because the relay node 300A has a higher-level radio communication function than the radio terminal 200A, the relay node 300A can perform excellent communication with the radio base station 100A. Furthermore, because the radio terminal 200A can perform radio communication with small transmission power, the battery consumption can be controlled.

Thus, the radio base station 100A controls a handover from the radio base station 100A to the relay node 300A based on whether or not a predetermined condition indicating that a state where a change in a relative distance between the radio terminal 200A and the relay node 300A either does not exist or is small is maintained is satisfied. If the predetermined condition is satisfied, then it can be assumed that the radio terminal 200A exists in the transportation equipment T. If the predetermined condition is not satisfied, then it can be assumed that the radio terminal 200A exists outside the transportation equipment T.

In the first embodiment, the predetermined condition is a condition where a value (first value) indicating an amount of change in the relative distance between the radio terminal 200A and the relay node 300A over a predetermined time period is equal to or less than a threshold value. The details of a method for controlling the handover are described later.

(1.2) Detailed Configuration of Radio Communication System

Next, (1.2.1) Configuration of radio terminal, (1.2.2) Configuration of relay node, and (1.2.3) Configuration of radio base station are explained.

(1.2.1) Configuration of Radio Terminal

Figure 2:
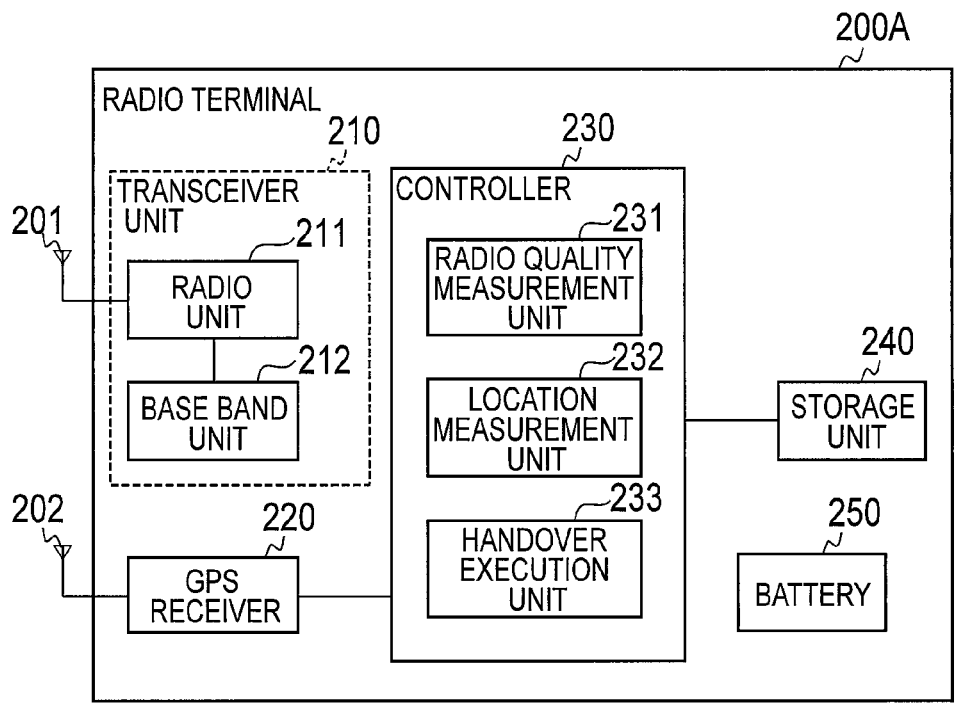
FIG. 2 is a block diagram illustrating the configuration of a radio terminal according to the first embodiment of the present invention.

FIG. 2 is a block diagram illustrating the configuration of the radio terminal 200A. As shown in FIG. 2, the radio terminal 200A has an antenna 201, an antenna 202, a transceiver unit 210, a GPS receiver 220, a controller 230, a storage unit 240, and a battery 250.

The transceiver unit 210 has a radio unit 211 configured to process a signal of a radio frequency band (that is, a radio signal), and a base band unit 212 configured to process a signal of a base band. The transceiver unit 210 transmits and receives a radio signal to and from the radio base station 100A or the relay node 300A via the antenna 201.

The GPS receiver 220 receives a signal from a GPS satellite via the antenna 202. The controller 230 is configured by using a CPU, for example, and controls various functions of the radio terminal 200A. The storage unit 240 is configured by using a memory, for example, and stores various types of information used for controlling the radio terminal 200A. The battery 250 is charged with an electric power supplied to each block of the radio terminal 200A.

The controller 230 has a radio quality measurement unit 231, a location measurement unit 232, and a handover execution unit 233.

The radio quality measurement unit 231 measures periodically or non-periodically the radio quality of a radio signal received by the transceiver unit 210. The transceiver unit 210 transmits a report of the measurement results by the radio quality measurement unit 231 to the radio base station 100A. As described above, RSSI or CINR is used as the radio quality, however, in addition to than just transmitting the value of RSSI or CINR, etc., as is, an index of RSSI or CINR, etc., can also be transmitted as the report of the measurement results to the radio base station 100A.

The location measurement unit 232 measures the location of the radio terminal 200A based on the signal received by the GPS receiver 220. The location measurement unit 232 corresponds to a first location measurement unit. The transceiver unit 210 transmits a report of the location measurement results by the location measurement unit 232 to the radio base station 100A.

The handover execution unit 233 performs a handover to the handover destination specified by a command for a handover when the transceiver unit 210 receives a command for a handover.

(1.2.2) Configuration of Relay Node

Figure 3:
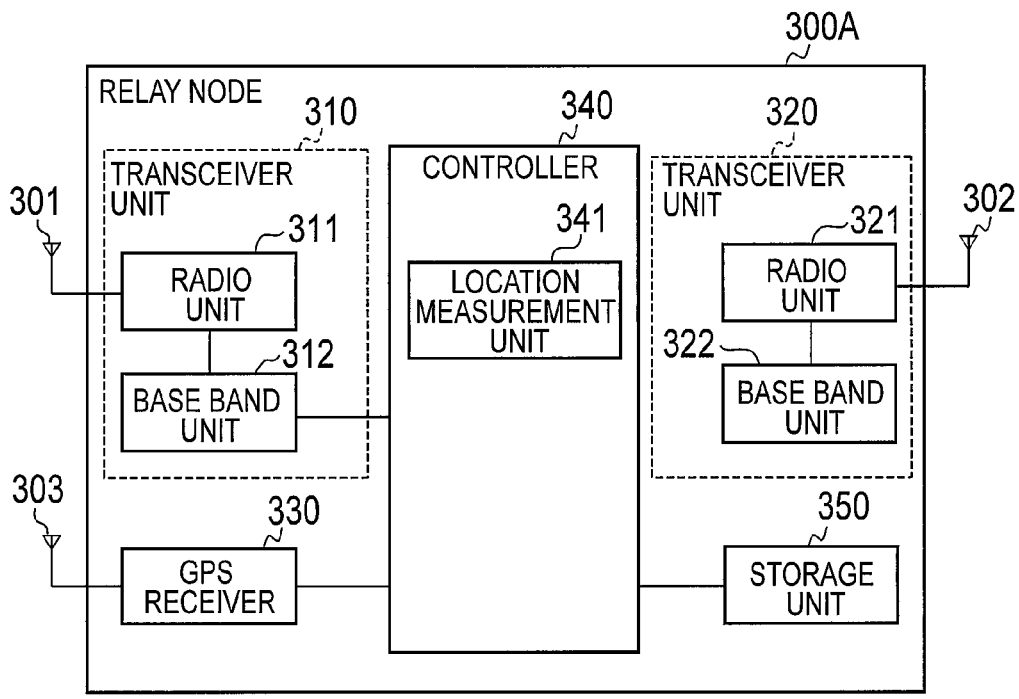
FIG. 3 is a block diagram illustrating the configuration of a relay node (a radio relay station) according to the first embodiment of the present invention.

FIG. 3 is a block diagram illustrating the configuration of the relay node 300A. As shown in FIG. 3, the relay node 300A has an antenna 301, an antenna 302, an antenna 303, a transceiver unit 310, a transceiver unit 320, a GPS receiver 330, a controller 340, and a storage unit 350.

The transceiver unit 310 has a radio unit 311 configured to process a radio signal, and a base band unit 312 configured to process a signal of a base band. The transceiver unit 310 transmits and receives a radio signal to and from the radio base station 100A via the antenna 301.

The transceiver unit 320 has a radio unit 321 configured to process a radio signal, and a base band unit 322 configured to process a signal of a base band. The transceiver unit 320 transmits and receives a radio signal to and from the radio terminal 200A via the antenna 302. The GPS receiver 330 receives a signal from a GPS satellite via the antenna 303. The controller 340 is configured by using a CPU, for example, and controls various functions of the relay node 300A. The storage unit 350 is configured by using a memory, for example, and stores various types of information used for controlling the relay node 300A.

The controller 340 has a location measurement unit 341. The location measurement unit 341 measures the location of the relay node 300A based on the signal received by the GPS receiver 330. The location measurement unit 232 corresponds to a second location measurement unit. The transceiver unit 310 transmits a report of the location measurement results by the location measurement unit 341 to the radio base station 100A.

(1.2.3) Configuration of Radio Base Station

Figure 4:
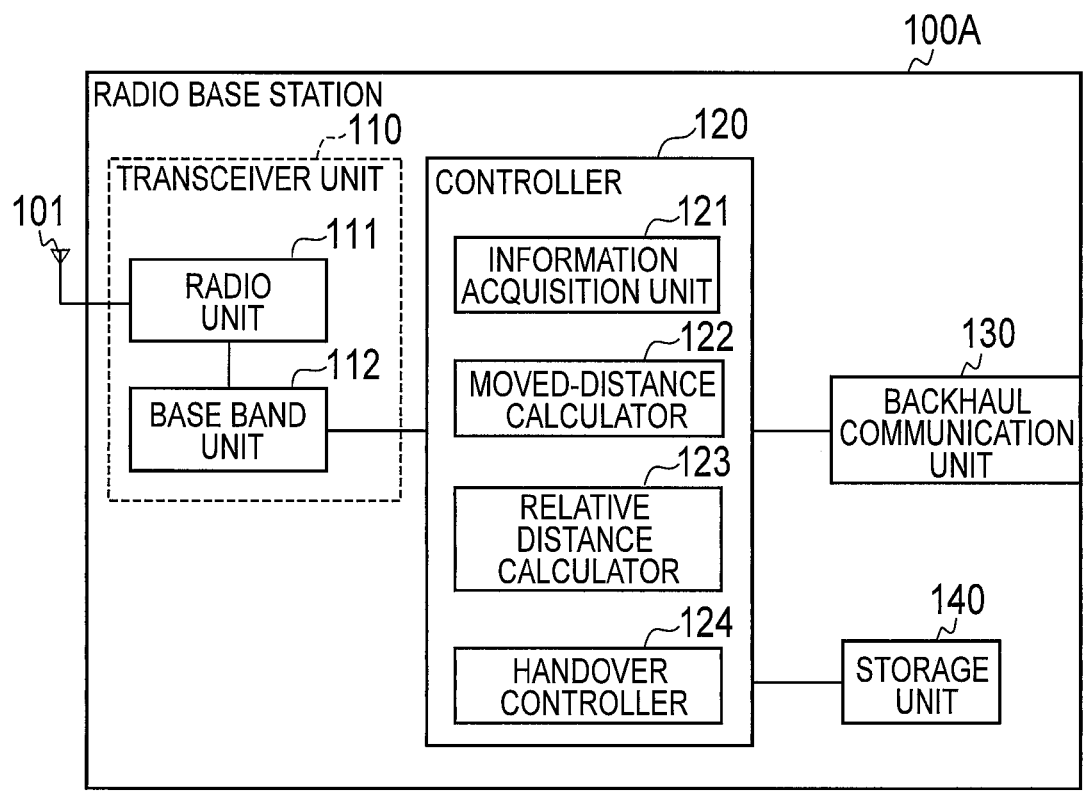
FIG. 4 is a block diagram illustrating the configuration of a radio base station according to the first embodiment of the present invention.

FIG. 4 is a block diagram illustrating the configuration of the radio base station 100A. As shown in FIG. 4, the radio base station 100A has an antenna 101, a transceiver unit 110, a controller 120, a backhaul communication unit 130, and a storage unit 140.

The transceiver unit 110 has a radio unit 111 configured to process a radio signal, and a base band unit 122 configured to process a signal of a base band. The transceiver unit 110 transmits and receives a radio signal to and from the radio terminal 200A or the relay node 300A via the antenna 101.

The controller 120 is configured by using a CPU, for example, and controls various functions of the radio base station 100A. The backhaul communication unit 130 performs communication with another radio base station via a backhaul network. The storage unit 140 is configured by using a memory, for example, and stores various types of information used for controlling the radio base station 100A.

The controller 120 has an information acquisition unit 121, a moved-distance calculator 122, a relative distance calculator 123, and a handover controller 124.

The information acquisition unit 121 acquires the location information (terminal location information) of the radio terminal 200A based on a report of the location measurement results that the transceiver unit 110 receives from the radio terminal 200A. Furthermore, the information acquisition unit 121 acquires the location information (relay station location information) of the relay node 300A based on a report of the location measurement results that the transceiver unit 110 receives from the relay node 300A.

The moved-distance calculator 122 calculates a value (second value) indicating a moved distance of the radio terminal 200A over a predetermined time period, and a value (third value) indicating a moved distance of the relay node 300A over a predetermined time period. The moved-distance calculator 122 corresponds to a second calculator. The details of a moved distance calculation operation by the moved-distance calculator 122 are described later.

The relative distance calculator 123 calculates a value (first value) indicating an amount of change in a relative distance between the radio terminal 200A and the relay node 300A over a predetermined time period, based on the terminal location information and the relay station location information acquired by the information acquisition unit 121. The relative distance calculator 123 corresponds to a first calculator. The details of a relative distance calculation operation by the relative distance calculator 123 are described later.

The handover controller 124 performs a control concerning a handover. For example, the handover controller 124 determines the handover destination and generates messages concerning a handover.

When the value indicating the amount of change of the relative distance calculated by the relative distance calculator 123 is equal to or less than a threshold value, the handover controller 124 generates a message instructing a handover from the radio base station 100A to the relay node 300A. The transceiver unit 110 transmits the message to the radio terminal 200A. The details of a handover control operation by the handover controller 124 are described later.

(2) Operation of Radio Communication System

Next, (2.1) Handover control operation, and (2.2) Detailed operation example of radio communication system are explained.

(2.1) Handover Control Operation

Figure 5:
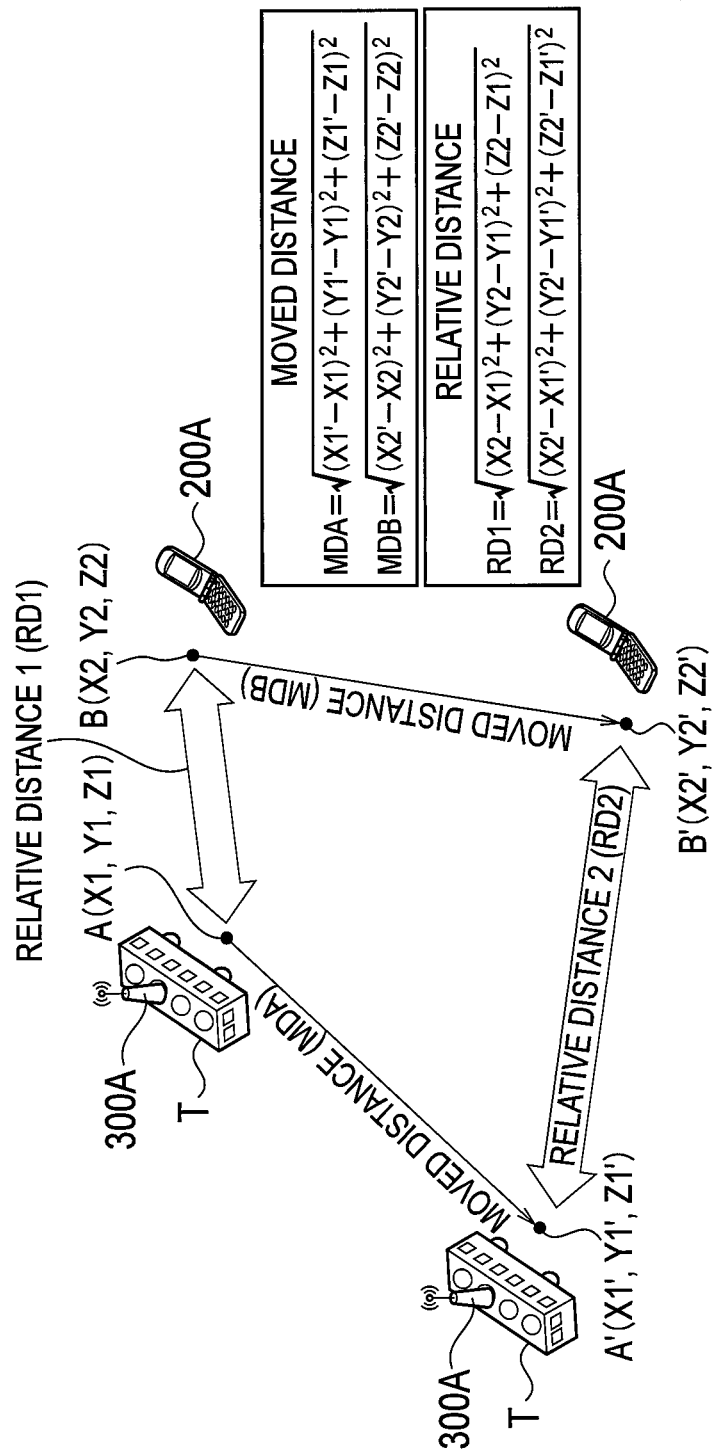
FIG. 5 is a diagram for explaining a handover control operation according to the first embodiment of the present invention (Part 1).
Figure 6:
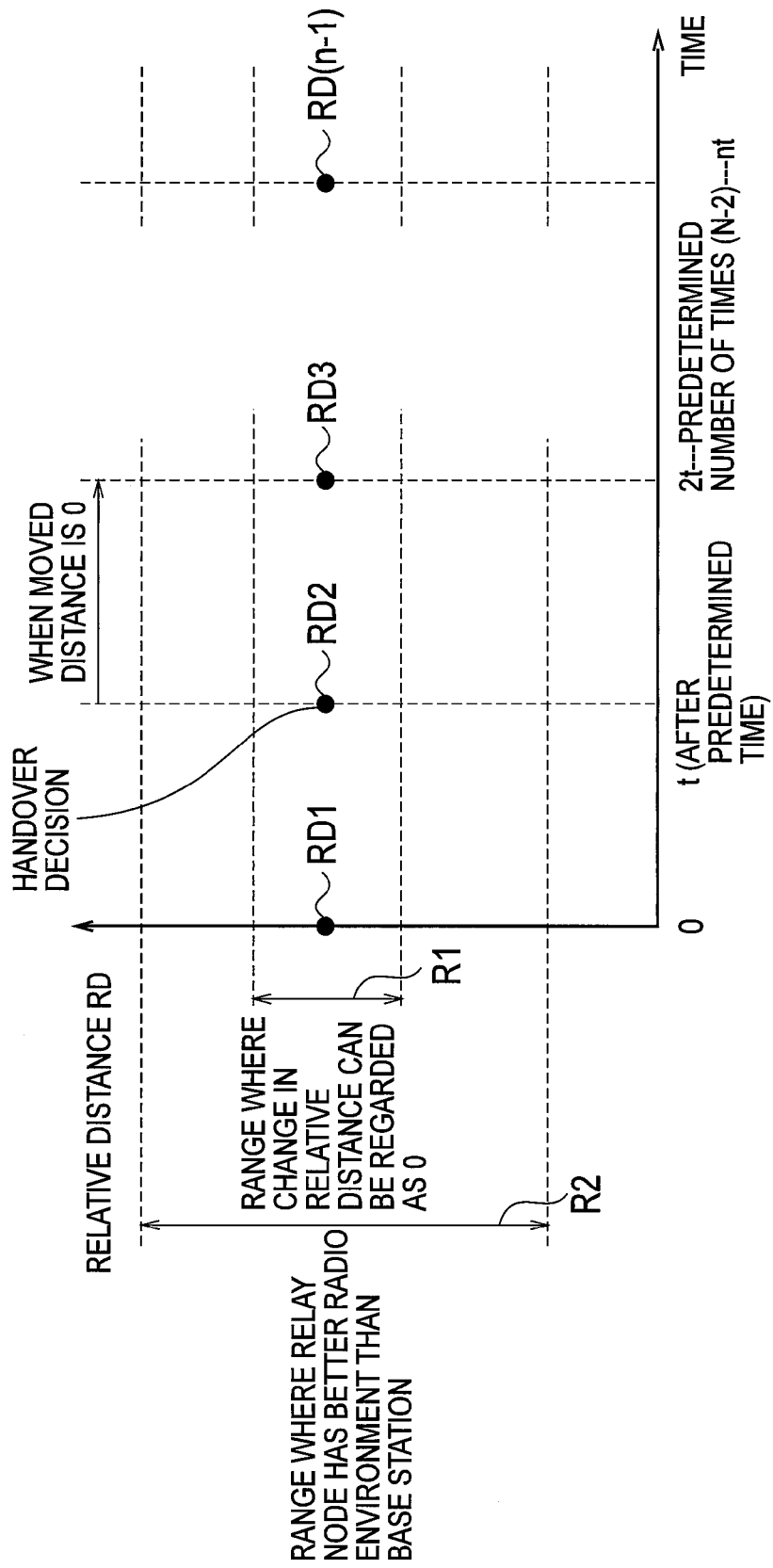
FIG. 6 is a diagram for explaining a handover control operation according to the first embodiment of the present invention (Part 2).

FIG. 5 and FIG. 6 are diagrams for explaining a handover control operation.

First of all, at a timing 0 (see FIG. 6) in a state when the level of the radio quality between the radio terminal 200A and the relay node 300A is higher than the level of the radio quality between the radio terminal 200A and the radio base station 100A, the information acquisition unit 121 acquires the location information A (X1, Y1, Z1) of the relay node 300A and the location information B (X2, Y2, Z2) of the radio terminal 200A, as shown in FIG. 5. Here, the location information is defined in terms of an X coordinate, a Y coordinate, and a Z coordinate, but the Z coordinate (vertical direction) need not necessarily be included in the location information.

After the lapse of a predetermined time period from the timing 0, at a timing t (see FIG. 6) in a state when the level of the radio quality between the radio terminal 200A and the relay node 300A is higher than the level of the radio quality between the radio terminal 200A and the radio base station 100A, the information acquisition unit 121 acquires the location information A' (X1', Y1', Z1') of the relay node 300A and the location information B' (X2', Y2', Z2') of the radio terminal 200A, as shown in FIG. 5.

By using the calculation equation described in FIG. 5, the moved-distance calculator 122 calculates the distance between A and A' as the moved distance of the relay node 300A (MDA), and calculates the distance between B and B' as the moved distance of the radio terminal 200A (MDB).

When at least one of the moved distance of the relay node 300A (MDA) or the moved distance of the radio terminal 200A (MDB) is more than zero, the relative distance calculator 123 calculates the relative distance 1 between A and B (RD1) and also calculates the relative distance 2 between A' and B' (RD2) according to the calculation equation described in FIG. 5. Additionally, the relative distance calculator 123 calculates the difference between the relative distance 1 (RD1) and the relative distance 2 (RD2) (For example, |RD1−RD2|). The difference in the relative distance thus calculated corresponds to the first value indicating the amount of change in the relative distance between the radio terminal 200A and the relay node 300A over a predetermined time period (period between 0 and t).

When the difference between the relative distance 1 (RD1) and the relative distance 2 (RD2) is equal to or less than a threshold value, the handover controller 124 generates a command for a handover from the radio base station 100A to the relay node 300A, and transmits the instruction from the transceiver unit 110 to the radio terminal 200A. Based on this, the radio terminal 200A performs a handover from the radio base station 100A to the relay node 300A.

On the other hand, when both the moved distance of the relay node 300A (MDA) and the moved distance of the radio terminal 200A (MDB) are zero, after the further lapse of a predetermined time period from the timing t, at a timing 2t in a state when the level of the radio quality between the radio terminal 200A and the relay node 300A is higher than the level of the radio quality between the radio terminal 200A and the radio base station 100A, the information acquisition unit 121 acquires the location information A" (X1", Y1", Z1") of the relay node 300A and the location information B" (X2", Y2", Z2") of the radio terminal 200A, as shown in FIG. 6.

The moved-distance calculator 122 calculates the distance between A and A" as the moved distance of the relay node 300A (MDA'), and calculates the distance between B and B" as the moved distance of the radio terminal 200A (MDB'). When at least one of the moved distance of the relay node 300A (MDA') or the moved distance of the radio terminal 200A (MDB') is more than zero, the relative distance calculator 123 calculates the relative distance 1 between A and B (RD1) and also calculates the relative distance 2 between A" and B" (RD2'). Additionally, the relative distance calculator 123 calculates the difference between the relative distance 1 (RD1) and the relative distance 2 (RD2') (For example, |RD1−RD2'|). When the difference is equal to or less than the threshold value, the handover controller 124 generates a command for a handover from the radio base station 100A to the relay node 300A, and transmits the instruction from the transceiver unit 110 to the radio terminal 200A.

Thus, when the level of the radio quality between the radio terminal 200A and the relay node 300A is higher than the level of the radio quality between the radio terminal 200A and the radio base station 100A, and the value of the amount of change (difference) in the relative distance is equal to or less than the threshold value, the handover controller 124 controls such that the radio terminal 200A executes a handover from the radio base station 100A to the relay node 300A.

Furthermore, when the level of the radio quality between the radio terminal 200A and the relay node 300A is higher than the level of the radio quality between the radio terminal 200A and the radio base station 100A, but the value of the amount of change (difference) in the relative distance is more than the threshold value, the handover controller 124 controls such that the radio terminal 200A does not execute a handover from the radio base station 100A to the relay node 300A.

By thus performing a handover control, it is possible to perform a handover to the relay node 300A when the radio terminal 200A exists in the transportation equipment T, and to not perform a handover to the relay node 300A when the radio terminal 200A does not exist in the transportation equipment T.

Furthermore, because it is difficult to determine whether or not the radio terminal 200A exists in the transportation equipment T when the moved distance of each of the radio terminal 200A and the relay node 300A is zero, the accuracy of determining whether or not the radio terminal 200A exists in the transportation equipment T is improved by calculating the value of the amount of change (difference) in the relative distance when the moved distance of at least one of the radio terminal 200A and the relay node 300A becomes more than zero.

(2.2) Detailed Operation Example of Radio Communication System

Figure 7:
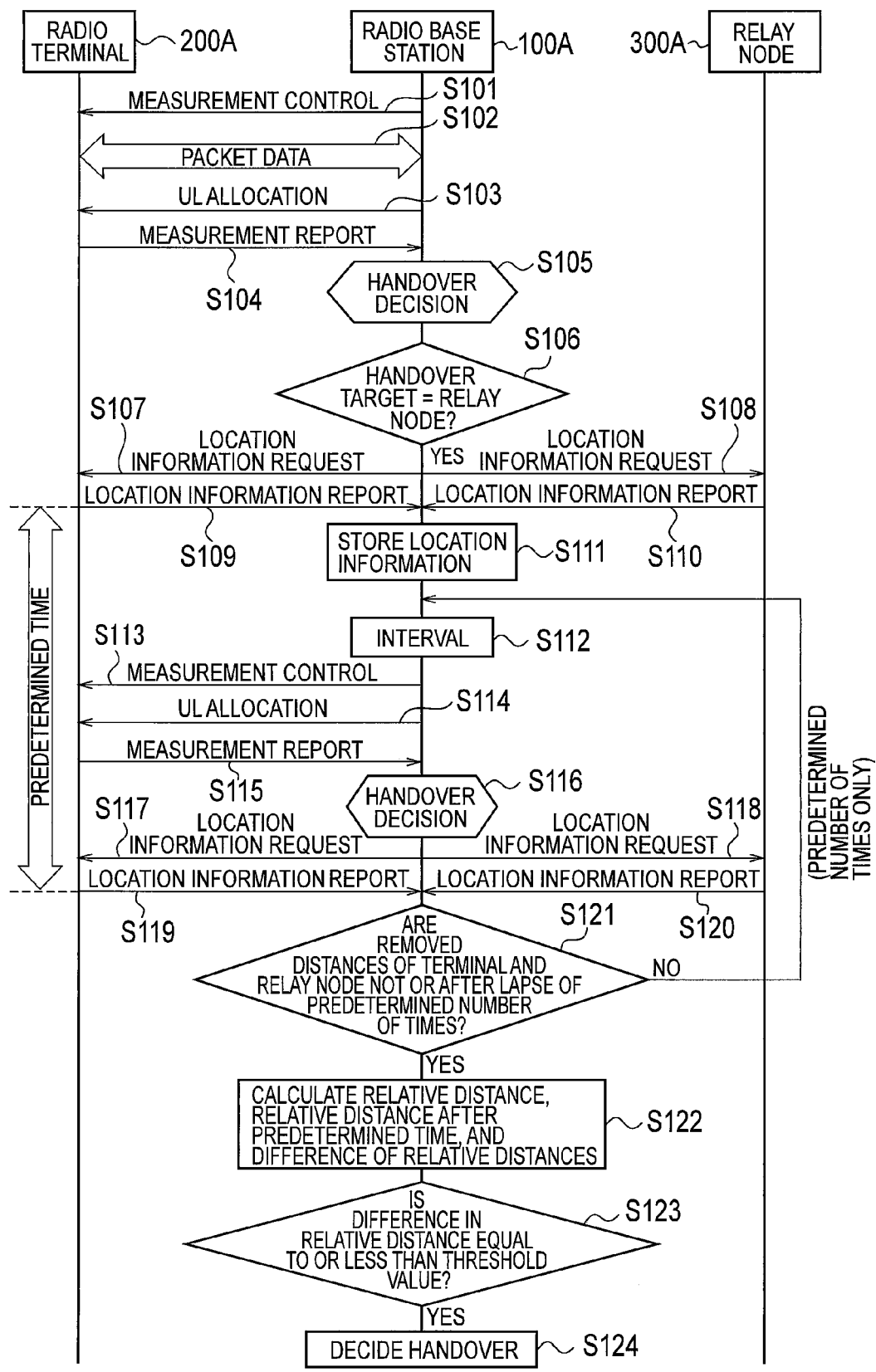
FIG. 7 is an operation sequence chart illustrating a detailed operation example of the radio communication system according to the first embodiment of the present invention.

FIG. 7 is an operation sequence chart illustrating a detailed operation example of the radio communication system 1.

In step S101, the radio base station 100A transmits "Measurement Control", which is a message for controlling the measurement of the radio quality in the radio terminal 200A, to the radio terminal 200A.

In step S102, the radio base station 100A transmits and receives the packet data, which is data other than the control data used for controlling the communication, to and from the radio terminal 200A. The transmission and reception of the packet data continues even after step S102.

In step S103, the radio base station 100A assigns a radio resource used for reporting the measurement results of the radio quality in the radio terminal 200A to the radio terminal 200A, and transmits UL allocation, which is a message indicating the assigned results, to the radio terminal 200A.

In step S104, the radio terminal 200A measures the radio quality of the received radio signal according to the Measurement Control received from the radio base station 100A in step S101, and transmits a measurement report, which is a message indicating the measurement results, to the radio base station 100A.

In step S105, the radio base station 100A decides whether or not it is necessary that the radio terminal 200A is made to perform a handover based on the measurement report received from the radio terminal 200A in step S104. The radio base station 100A compares the radio quality corresponding to the radio base station 100A and the radio quality corresponding to another node (another radio station or the relay node 300A), and if the radio quality corresponding to another node is better than the radio quality corresponding to the radio base station 100A, the radio base station 100A decides that it is necessary that the radio terminal 200A is made to perform a handover.

In step S106, the radio base station 100A determines whether or not the handover target, which is the candidate of the handover destination of the radio terminal 200A, is the relay node 300A. The radio base station 100A determines whether or not the handover target is the relay node 300A based on the cell ID included in the measurement report, for example. If the handover target is the relay node 300A, the process proceeds further.

In step S107, the radio base station 100A transmits a location information request requesting the transmission of information about the location measurement results to the radio terminal 200A. In step S108, the radio base station 100A transmits a location information request requesting the transmission of information about the location measurement results to the relay node 300A.

When the radio terminal 200A receives the location information request from the radio base station 100A in step S107, the radio terminal 200A performs location measurement in step S109, and at the same time, transmits a location information report indicating the location measurement results to the radio base station 100A.

When the relay node 300A receives the location information request from the radio base station 100A in step S108, the relay node 300A performs location measurement in step S110, and at the same time, transmits a location information report indicating the location measurement results to the radio base station 100A.

In step S111, the radio base station 100A stores the location information of the radio terminal 200A based on the location information report received from the radio terminal 200A in step S109. Based on the location information report received from the relay node 300A in step S110, the radio base station 100A stores the location information of the relay node 300A.

In step S112, the radio base station 100A clocks a fixed time period. After the lapse of a fixed time period, the radio base station 100A transmits the Measurement Control to the radio terminal 200A in step S113.

In step S114, the radio base station 100A assigns a radio resource used for reporting the measurement results of the radio quality in the radio terminal 200A to the radio terminal 200A, and transmits the UL allocation to the radio terminal 200A.

In step S115, the radio terminal 200A measures the radio quality of the received radio signal according to the Measurement Control received from the radio base station 100A in step S114, and transmits a measurement report to the radio base station 100A.

In step S116, the radio base station 100A decides whether or not it is necessary that the radio terminal 200A is made to perform a handover based on the measurement report received from the radio terminal 200A in step S115. The radio base station 100A compares the radio quality corresponding to the radio base station 100A and the radio quality corresponding to the relay node 300A, and if the radio quality corresponding to the relay node 300A is better than the radio quality corresponding to the radio base station 100A, the radio base station 100A decides that it is necessary that the radio terminal 200A is made to perform a handover to the relay node 300A. When it is decided that the radio terminal 200A is made to perform a handover to the relay node 300A, the process proceeds further.

In step S117, the radio base station 100A transmits a location information request to the radio terminal 200A. In step S118, the radio base station 100A transmits a location information request to the relay node 300A.

When the radio terminal 200A receives the location information request from the radio base station 100A in step S117, the radio terminal 200A again performs location measurement in step S119, and at the same time, transmits a location information report indicating the location measurement results to the radio base station 100A.

When the relay node 300A receives the location information request from the radio base station 100A in step S118, the relay node 300A again performs location measurement in step S120, and at the same time, transmits a location information report indicating the location measurement results to the radio base station 100A.

Here, the time period from the time the radio base station 100A receives the location information report from the radio terminal 200A and the relay node 300A until the time period the radio base station 100A again receives the location information report from the radio terminal 200A and the relay node 300A due to a location information re-request from the radio base station 100A is considered as the predetermined time period.

In step S121, the radio base station 100A calculates the moved distance of the radio terminal 200A and the relay node 300A, respectively. When the moved distance of both the radio terminal 200A and the relay node 300A is zero, the process returns to step S112. Note that, in this case, the number of times the radio base station 100A can repeat this process is to be limited, and this frequency is a predetermined number of times (see FIG. 6). If the moved distance of at least one of the radio terminal 200A and the relay node 300A is more than zero, the process proceeds to step S122.

In step S122, the radio base station 100A calculates a relative distance 1 from the location information of the radio terminal 200A and the relay node 300A that has been maintained in step S111, and calculates a relative distance 2 based on the location information report received in step S119 and S120. Also, the radio base station 100A calculates the difference between the relative distance 1 and the relative distance 2.

If the difference between the relative distance 1 and the relative distance 2 in step S122 is equal to or less than the threshold value, then in step S124, the radio base station 100A determines a handover from the radio base station 100A to the relay node 300A, and transmits a command for a handover from the radio base station 100A to the relay node 300A to the radio terminal 200A. On the other hand, if the difference between the relative distance 1 and the relative distance 2 in step S122 is more than the threshold value, the radio base station 100A cancels the handover from the radio base station 100A to the relay node 300A.

(3) Operation and Effect of First Embodiment

As described above, when the level of the radio quality between the radio terminal 200A and the relay node 300A is higher than the level of the radio quality between the radio terminal 200A and the radio base station 100A, and the value of the amount of change (difference) in the relative distance is equal to or less than the threshold value, the handover controller 124 of the radio base station 100A controls such that the radio terminal 200A executes a handover from the radio base station 100A to the relay node 300A.

Furthermore, when the level of the radio quality between the radio terminal 200A and the relay node 300A is higher than the level of the radio quality between the radio terminal 200A and the radio base station 100A, but the value of the amount of change (difference) in the relative distance is more than the threshold value, the handover controller 124 controls such that the radio terminal 200A does not execute a handover from the radio base station 100A to the relay node 300A.

By thus performing a handover control, it is possible to perform a handover to the relay node 300A when the radio terminal 200A exists in the transportation equipment T, and to not perform a handover to the relay node 300A when the radio terminal 200A does not exist in the transportation equipment T. Therefore, according to the first embodiment, the occurrence of a process load and communication delay due to a useless handover can be prevented.

Specifically, as compared with a handover between radio base stations, the overheads increase for a handover from the radio base station 100A to the relay node 300A. According to the first embodiment, because the probability of performing a handover from the radio base station 100A to the relay node 300A can be reduced, the overheads can be inhibited.

Furthermore, by calculating the value of the amount of change (difference) in the relative distance when the moved distance of at least one of the radio terminal 200A and the radio base station 100A becomes more than zero rather than calculating the value of the amount of change (difference) in the relative distance when the moved distance of both the radio terminal 200A and the radio base station 100A is zero, the determination accuracy can be improved.

Furthermore, in a case where the relay node 300A performs the process concerning handover of the radio terminal, the traffic load in the radio space increases due to the control messages between the relay node 300A and the radio base station 100A and also due to packet transfer of the radio terminal for which a handover is to be execute. As in the first embodiment, because the radio base station 100A performs the process concerning handover of the radio terminal, an increase in the traffic load can be avoided.

In the first embodiment, the handover controller 124 transmits a location information request to the radio terminal 200A and the relay node 300A when the level of the radio quality between the radio terminal 200A and the relay node 300A is higher than the level of the radio quality between the radio terminal 200A and the radio base station 100A. That is, the handover controller 124 does not transmit a location information request to the radio terminal 200A and the relay node 300A when the level of the radio quality between the radio terminal 200A and the relay node 300A is equal to or lower than the level of the radio quality between the radio terminal 200A and the radio base station 100A.

Thus, the location information report can be transmitted to the radio terminal 200A and the relay node 300A only when it is necessary to perform a handover. Therefore, the overheads can be reduced as compared to the case when the radio terminal 200A and the relay node 300A periodically transmit the location information report.

Second Embodiment

Next, a second embodiment of the present invention is explained. Specifically, (1) Configuration of radio communication system, (2) Configuration of radio terminal, (3) Configuration of relay node, (4) Detailed operation example of radio communication system, and (5) Operation and effect of second embodiment are explained.

The second embodiment will be described while focusing mainly on the difference from the first embodiment, and duplicate description will be omitted.

(1) Configuration of Radio Communication System

Figure 8:
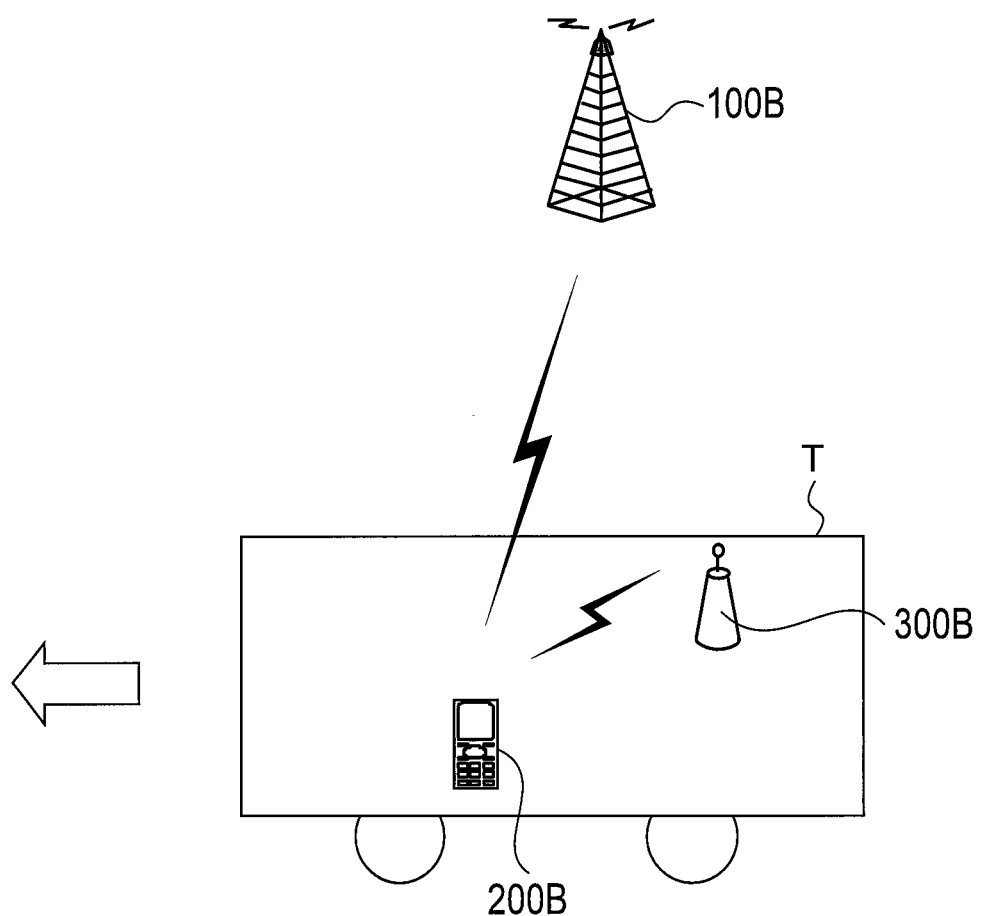
FIG. 8 is a diagram illustrating the configuration of the radio communication system according to a second embodiment of the present invention.

FIG. 8 is a diagram illustrating the configuration of a radio communication system according to a second embodiment.

As shown in FIG. 8, a relay node 300B is installed in the transportation equipment T that a user of a radio terminal 200B can board. The transportation equipment T is not limited to a bus provided as an example in the first embodiment, and may be a train, for example.

In FIG. 8, a case in which the radio terminal 200B exists in the transportation equipment T is provided as an example. Similar to the first embodiment, the radio base station 100B is an unmovable macro base station. The radio terminal 200B is connected to the radio base station 100B.

The radio terminal 200B and the relay node 300B according to the second embodiment do not have a positioning system such as GPS.

The radio terminal 200B and the relay node 300B respectively include a communication unit configured to perform communication conforming to a communication scheme different from LTE. The communication scheme is the near field radio communication scheme having a communication distance such that communication can be performed only in the transportation equipment T. Examples of the near field radio communication scheme include Bluetooth, ZigBee, UWB (Ultra Wide Band).

The radio base station 100B controls a handover from the radio base station 100B to the relay node 300B based on whether or not a predetermined condition indicating that a state where a change in a relative distance between the radio terminal 200B and the relay node 300B either does not exist or is small is maintained is satisfied. In the second embodiment, the predetermined condition is a condition where a connection (a so-called communication connection) is established based on the near field radio communication scheme in the radio terminal 200B and the relay node 300B. The details of a method for controlling the handover are described later.

(2) Configuration of Radio Terminal

Figure 9:
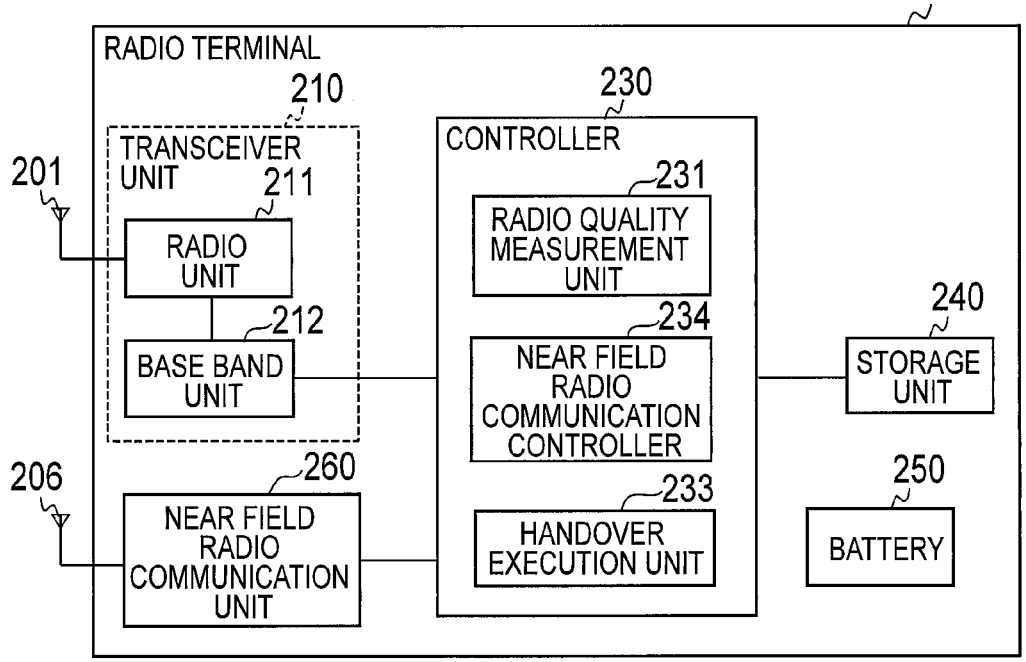
FIG. 9 is a block diagram illustrating the configuration of a radio terminal according to the second embodiment of the present invention.

FIG. 9 is a block diagram illustrating the configuration of the radio terminal 200B. As shown in FIG. 9, the radio terminal 200B is different from the radio terminal 200A according to the first embodiment in that it has a near field radio communication unit 260. The near field radio communication unit 260 performs radio communication conforming to the near field radio communication scheme via an antenna 206. The near field radio communication unit 260 corresponds to a second communication unit. The controller 230 has a near field radio communication controller 234 configured to control the radio communication by the near field radio communication unit 260.

(3) Configuration of Relay Node

FIG. 10 is a block diagram illustrating the configuration of the relay node 300B. As shown in FIG. 10, the relay node 300B is different from the relay node 300A according to the first embodiment in that it has a near field radio communication unit 360. The near field radio communication unit 360 performs radio communication conforming to the near field radio communication scheme via an antenna 306. The near field radio communication unit 360 corresponds to a first communication unit. The controller 340 has a near field radio communication controller 341 configured to control the radio communication by the near field radio communication unit 360.

(4) Detailed Operation Example of Radio Communication System

Figure 11:
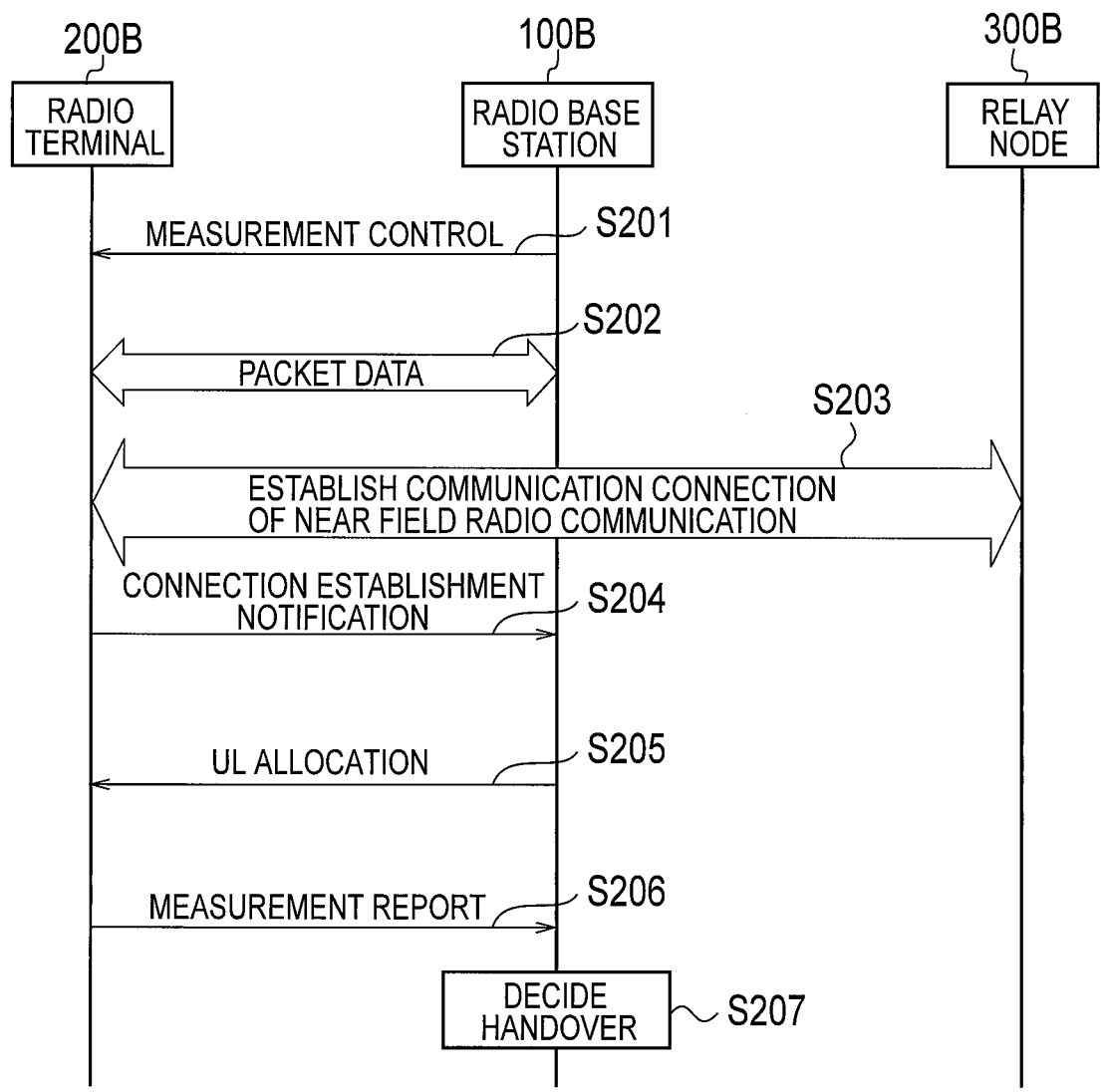
FIG. 11 is an operation sequence chart illustrating a detailed operation example of the radio communication system according to the second embodiment of the present invention.

FIG. 11 is an operation sequence chart illustrating a detailed operation example of the radio communication system according to the second embodiment.

In step S201, the radio base station 100B transmits Measurement Control, which is a message for controlling the measurement of the radio quality in the radio terminal 200B, to the radio terminal 200B.

In step S202, the radio base station 100B transmits and receives the packet data (so-called user data), which is data other than the control data used for controlling the communication, to and from the radio terminal 200B. The transceiver of the packet data continues even after step S202.

In step S203, the near field radio communication controller 234 of the radio terminal 200B establishes a connection with the relay node 300B using the near field radio communication unit 260 based on the near field radio communication scheme. For example, if the radio terminal 200B moves inside the near field radio communication area of the relay node 300B, the near field radio communication controller 234 of the radio terminal 200B detects that equipment supporting the near field radio communication scheme exists nearby, and automatically establishes a connection based on the near field radio communication scheme.

In step S204, the radio terminal 200B transmits a connection establishment notification, which is a message indicating that a connection has been established with the relay node 300B based on the near field radio communication scheme, to the radio base station 100B.

In step S205, the radio base station 100B assigns a radio resource used for reporting the measurement results of the radio quality in the radio terminal 200B to the radio terminal 200A, and transmits UL allocation, which is a message indicating the assigned results, to the radio terminal 200B.

In step S206, the radio terminal 200B measures the radio quality of the received radio signal according to the Measurement Control received from the radio base station 100B in step S201, and transmits a measurement report, which is a message indicating the measurement results, to the radio base station 100B.

In step S207, the radio base station 100B determines whether or not the radio terminal 200B is made to perform a handover. When the level of the radio quality between the radio terminal 200B and the relay node 300B is higher than the level of the radio quality between the radio terminal 200B and the radio base station 100B, and a connection is established between the radio terminal 200B and the relay node 300B based on the near field radio communication scheme, the radio base station 100B determines that the radio terminal 200B is made to execute a handover from the radio base station 100B to the relay node 300B. When it is determined that the radio terminal 200B is made to execute a handover from the radio base station 100B to the relay node 300B, the radio base station 100B generates a command for a handover, and transmits the generated instruction for a handover to the radio terminal 200B.

(5) Operation and Effect of Second Embodiment

As described above, according to the second embodiment, the handover controller 124 of the radio base station 100B controls the handover from the radio base station 100B to the relay node 300B based on whether or not a connection is established between the radio terminal 200B and the relay node 300B by the near field radio communication scheme.

Specifically, when the level of the radio quality between the radio terminal 200B and the relay node 300B is higher than the level of the radio quality between the radio terminal 200B and the radio base station 100B, but a connection is not established between the radio terminal 200B and the relay node 300B based on the near field radio communication scheme, the handover controller 124 controls such that the radio terminal 200B does not execute a handover from the radio base station 100B to the relay node 300B.

By thus performing a handover control, it is possible to perform a handover to the relay node 300A when the radio terminal 200B exists in the transportation equipment T, and to not perform a handover to the relay node 300B when the radio terminal 200B does not exist in the transportation equipment T.

Therefore, according to the second embodiment, the occurrence of a process load and communication delay due to a useless handover can be prevented. Additionally, the second embodiment is also applicable to the radio terminal 200B and the relay node 300B that do not have a positioning system such as the first embodiment.

Modification of Second Embodiment

Next, a modification of the second embodiment is explained. In the present modification, the near field radio communication scheme of the second embodiment is changed to a non-contact IC card communication scheme. The communicable distance of the non-contact IC card communication scheme is extremely small, for example, around 10 cm.

Figure 12:
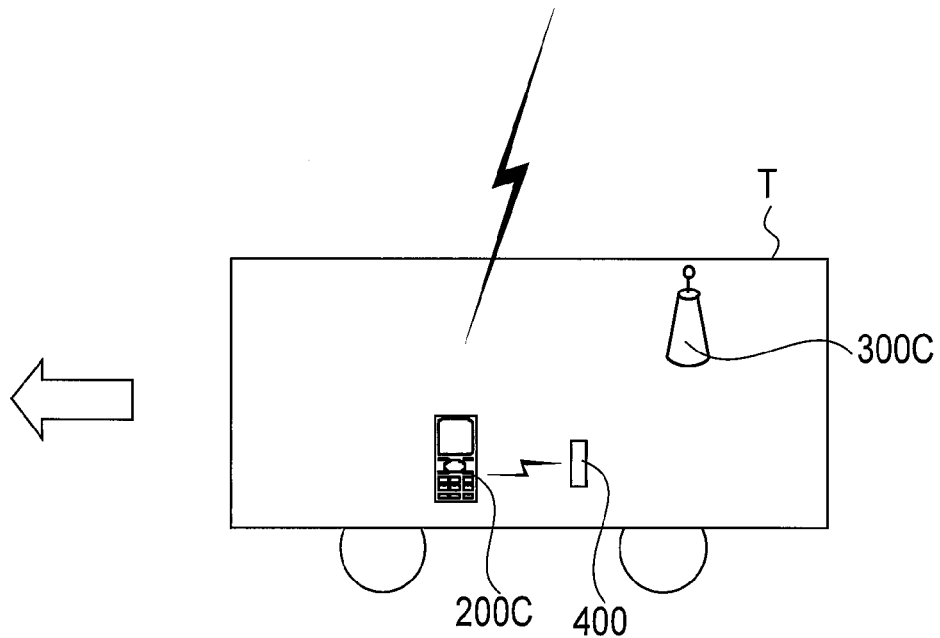
FIG. 12 is a diagram illustrating the configuration of a radio communication system according to a modification of the second embodiment of the present invention.

FIG. 12 is a diagram illustrating the configuration of a radio communication system according to the modification of the second embodiment. As shown in FIG. 12, the transportation equipment T has a non-contact IC card communication unit 400. The non-contact IC card communication unit 400 has a card reader/writer function, and is used for fare adjustment in a periphery, such as the entry or exit points of the transportation equipment T, for example. The non-contact IC card communication unit 400 provided in the transportation equipment T corresponds to a first communication unit.

The handover controller 124 of the radio base station 100C controls the handover from the radio base station 100C to the relay node 300C based on whether or not a connection (so-called communication connection) is established between the radio terminal 200C and the relay node 300C by the non-contact IC card communication scheme.

Figure 13:
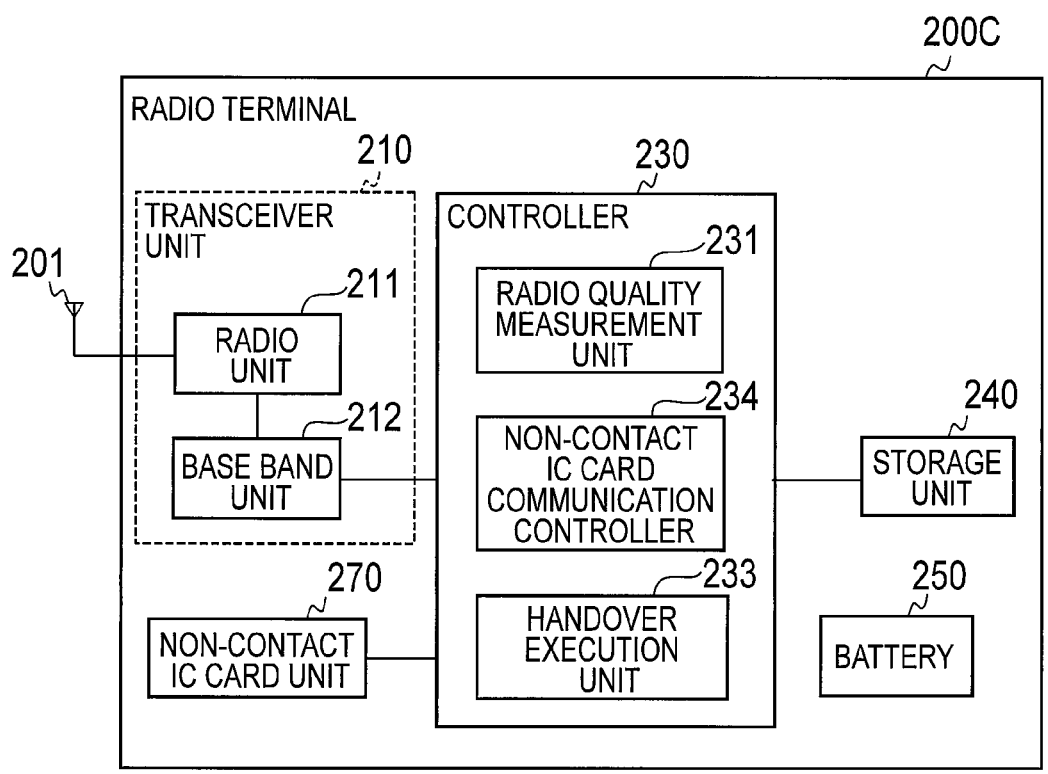
FIG. 13 is a block diagram illustrating the configuration of a radio terminal according to the modification of the second embodiment of the present invention.

FIG. 13 is a block diagram illustrating the configuration of a radio terminal 200C. As shown in FIG. 13, the radio terminal 200C is different from the radio terminal 200B according to the second embodiment in that it has a non-contact IC card unit 270. The non-contact IC card unit 270 performs radio communication conforming to the non-contact IC card communication scheme. The non-contact IC card unit 270 corresponds to a second communication unit. The controller 230 has a non-contact IC card communication controller 235 configured to control the radio communication based on the non-contact IC card communication scheme.

Figure 14:
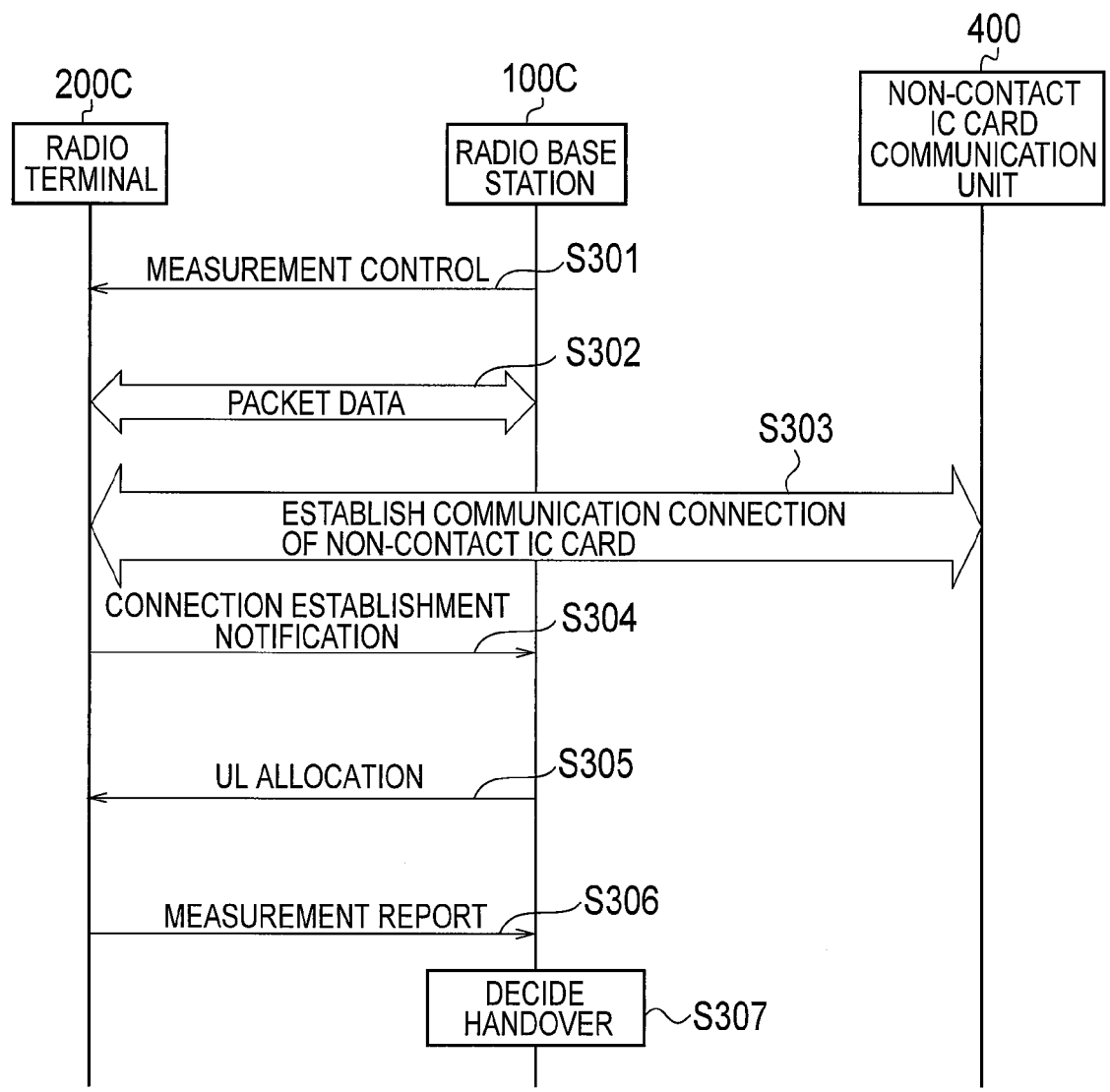
FIG. 14 is an operation sequence chart illustrating a detailed operation example of the radio communication system according to the modification of the second embodiment of the present invention.

Next, a detailed operation example of a radio communication system according to the present modification is explained. However, the operation that is different from the aforementioned second embodiment is explained, and duplicate description is omitted. FIG. 14 is an operation sequence chart illustrating a detailed operation example of the radio communication system according to the present modification.

The processes of step S301 and S302 are the same as the aforementioned second embodiment.

In step S303, the non-contact IC card communication controller 235 of the radio terminal 200C establishes a connection with the non-contact IC card communication unit 400 based on the non-contact IC card communication scheme, using the non-contact IC card unit 270. For example, if the radio terminal 200C moves inside the non-contact IC card communication area of the non-contact IC card communication unit 400, the non-contact IC card communication controller 235 of the radio terminal 200C detects that equipment supporting the non-contact IC card communication scheme exists nearby, and automatically establishes a connection based on the non-contact IC card communication scheme.

In step S304, the non-contact IC card communication controller 235 of the radio terminal 200C transmits a connection establishment notification, which is a message indicating that a connection was established with the non-contact IC card communication unit 400 based on the non-contact IC card communication scheme, to the radio base station 100C.

The processes of step S305 and S306 are the same as the aforementioned second embodiment.

In step S307, the handover controller 124 of the radio base station 100C determines whether or not the radio terminal 200C is made to perform a handover. When the level of the radio quality between the radio terminal 200C and the relay node 300C is higher than the level of the radio quality between the radio terminal 200C and the radio base station 100C, and a connection is established between the radio terminal 200C and the non-contact IC card communication unit 400 based on the non-contact IC card communication scheme, the handover controller 124 determines that the radio terminal 200C is made to execute a handover from the radio base station 100C to the relay node 300C.

When it is determined that the radio terminal 200C is made to execute a handover from the radio base station 100C to the relay node 300C, the radio base station 100C generates a command for a handover from the radio base station 100C to the relay node 300C, and transmits the generated instruction for a handover to the radio terminal 200C.

As described above, according to the present modification, the handover controller 124 of the radio base station 100C controls the handover from the radio base station 100C to the relay node 300C based on whether or not a connection is established between the radio terminal 200C and the relay node 300C by the non-contact IC card communication scheme.

Specifically, when the level of the radio quality between the radio terminal 200C and the relay node 300C is higher than the level of the radio quality between the radio terminal 200C and the radio base station 100C, but a connection is not established between the radio terminal 200C and the relay node 300C based on the non-contact IC card communication scheme, the handover controller 124 controls such that the radio terminal 200C does not execute a handover from the radio base station 100C to the relay node 300C. By thus performing a handover control, the same effect as in the second embodiment can be achieved.

Third Embodiment

Next, a third embodiment of the present invention is explained. Specifically, (1) Configuration of radio communication system, (2) Operation of radio communication system, and (3) Operation and effect of third embodiment are explained in this order.

The third embodiment will be described while focusing mainly on the difference from the first embodiment, and duplicate description will be omitted.

(1) Configuration of Radio Communication System

Figure 15:
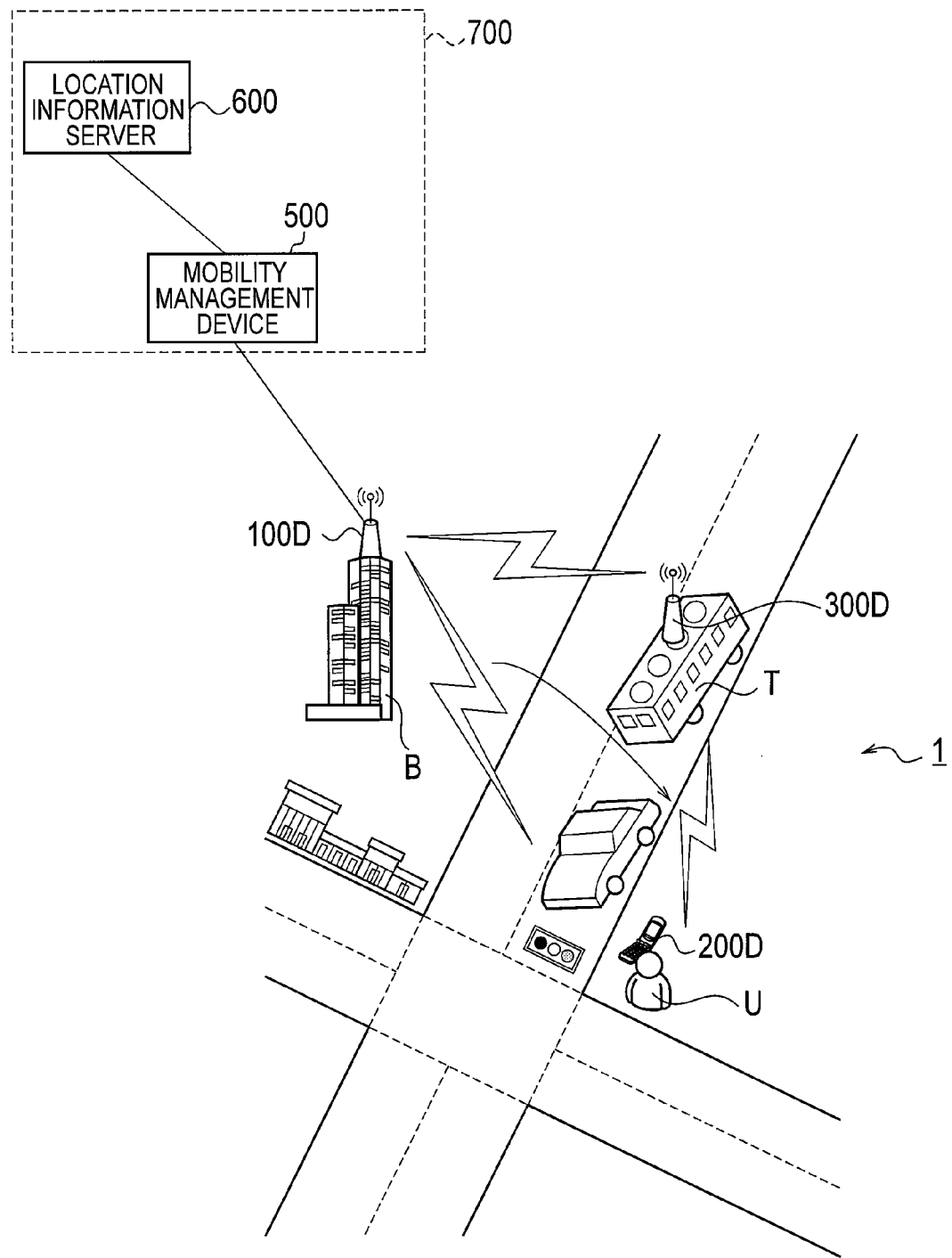
FIG. 15 is a diagram illustrating the configuration of a radio communication system according to a third embodiment of the present invention.

FIG. 15 is a diagram illustrating the configuration of the radio communication system 1 according to a third embodiment. As shown in FIG. 15, the radio communication system 1 according to the third embodiment is configured based on LTE-Advanced similar to the first embodiment, and has a radio base station 100D, a radio terminal 200D, a relay node 300D (a radio relay station), and a core network 700.

In the third embodiment, the core network 700 is configured such that the location information of each of the radio terminal 200D and the relay node 300D can be acquired even when each of the radio terminal 200D and the relay node 300D does not have a system, such as GPS, for acquiring the own location information.

Specifically, the core network 700 has a mobility management device 500, which is an upper level device of the radio base station 100D, and a location information server 600 that manages the location information of each of the radio terminal 200D and the relay node 300D. In LTE, the mobility management device 500 is called MME (Mobility Management Entity), and the location information server 600 is called E-SMLC (e-ServingMobile Location Center).

A location information server 600 collects an arrival-time-period difference of the radio signals that each of the radio terminal 200D and the relay node 300D receives from a plurality of radio base stations, and also the base station IDs included in the radio signals, and generates and manages the location information of each of the radio terminal 200D and the relay node 300D. For details on the location information server 600 (E-SMLC), see 3GPP TS 36.305: "Evolved Universal Terrestrial Radio Access Network (E-UTRAN); Stage 2 functional specification of User Equipment (UE) positioning in E-UTRAN".

Furthermore, in the third embodiment, the calculation process of each of the moved distance and the relative distance executed by the radio base station 100A in the first embodiment is executed by the mobility management device 500. The system configuration besides this is same as the first embodiment.

Figure 16:
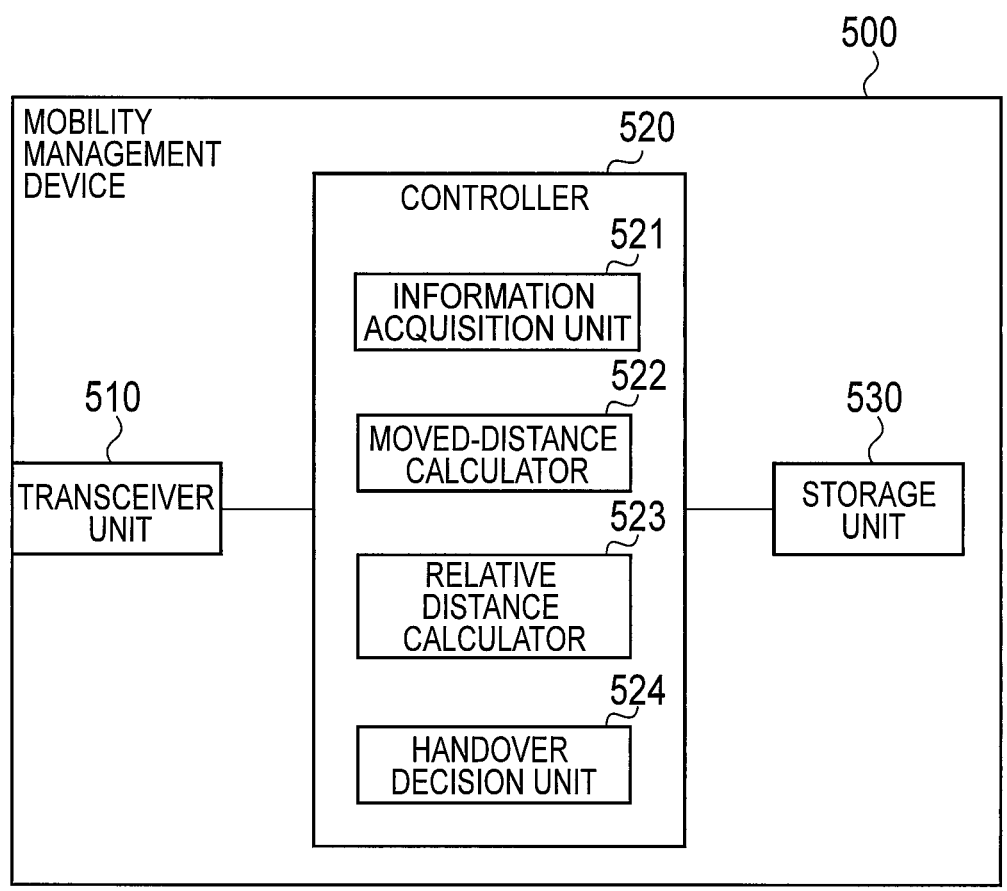
FIG. 16 is a block diagram illustrating the configuration of a mobile management device according to the third embodiment of the present invention.

FIG. 16 is a block diagram illustrating the configuration of the mobility management device 500. As shown in FIG. 16, the mobility management device 500 has a transceiver unit 510, a controller 520, and a storage unit 530.

The transceiver unit 510 is connected to a backhaul network, and performs wired communication between the radio base station 100A and the location information server 600 via the backhaul network. The transceiver unit 510 receives the location information of each of the radio terminal 200D and the relay node 300D from the location information server 600. The controller 520 is configured by using a CPU, for example, and controls various functions of the mobility management device 500. The storage unit 530 is configured by using a memory, for example, and stores various types of information used for controlling the mobility management device 500.

The controller 520 has an information acquisition unit 521, a moved-distance calculator 522, a relative distance calculator 523, and a handover decision unit 524.

The information acquisition unit 521 acquires the location information that the transceiver unit 510 receives from the location information server 600. The moved-distance calculator 522 calculates a value indicating the moved distance of each of the radio terminal 200D and the relay node 300D over a predetermined time period. However, in the third embodiment, the moved-distance calculator 522 calculates the moved distance of only the relay node 300D and may skip the calculation of the moved distance of the radio terminal 200D.

In the third embodiment, the moved-distance calculator 522 corresponds to a second calculator. The details of a moved distance calculation operation by the moved-distance calculator 522 are described later.

The relative distance calculator 523 calculates a value (first value) indicating an amount of change in a relative distance between the radio terminal 200D and the relay node 300D over a predetermined time period, based on the location information acquired by the information acquisition unit 521. The relative distance calculator 523 corresponds to a first calculator. The details of a relative distance calculation operation by the relative distance calculator 523 are described later.

The handover decision unit 524 performs a decision concerning a handover. Specifically, the handover decision unit 524 decides whether or not to allow a handover of the radio terminal 200D to the relay node 300D.

(2) Operation of Radio Communication System

Next, an operation of the radio communication system 1 according to the third embodiment is explained in the order of (2.1) Handover control operations and (2.2) Detailed operation example of the radio communication system.

(2.1) Handover Control Operation

Handover control operations 1 and 2 executed by the mobility management device 500 are explained below. Here, mainly the differences from the handover control operation explained in the first embodiment are explained.

(2.1.1) Handover Control Operation 1

Figure 17:
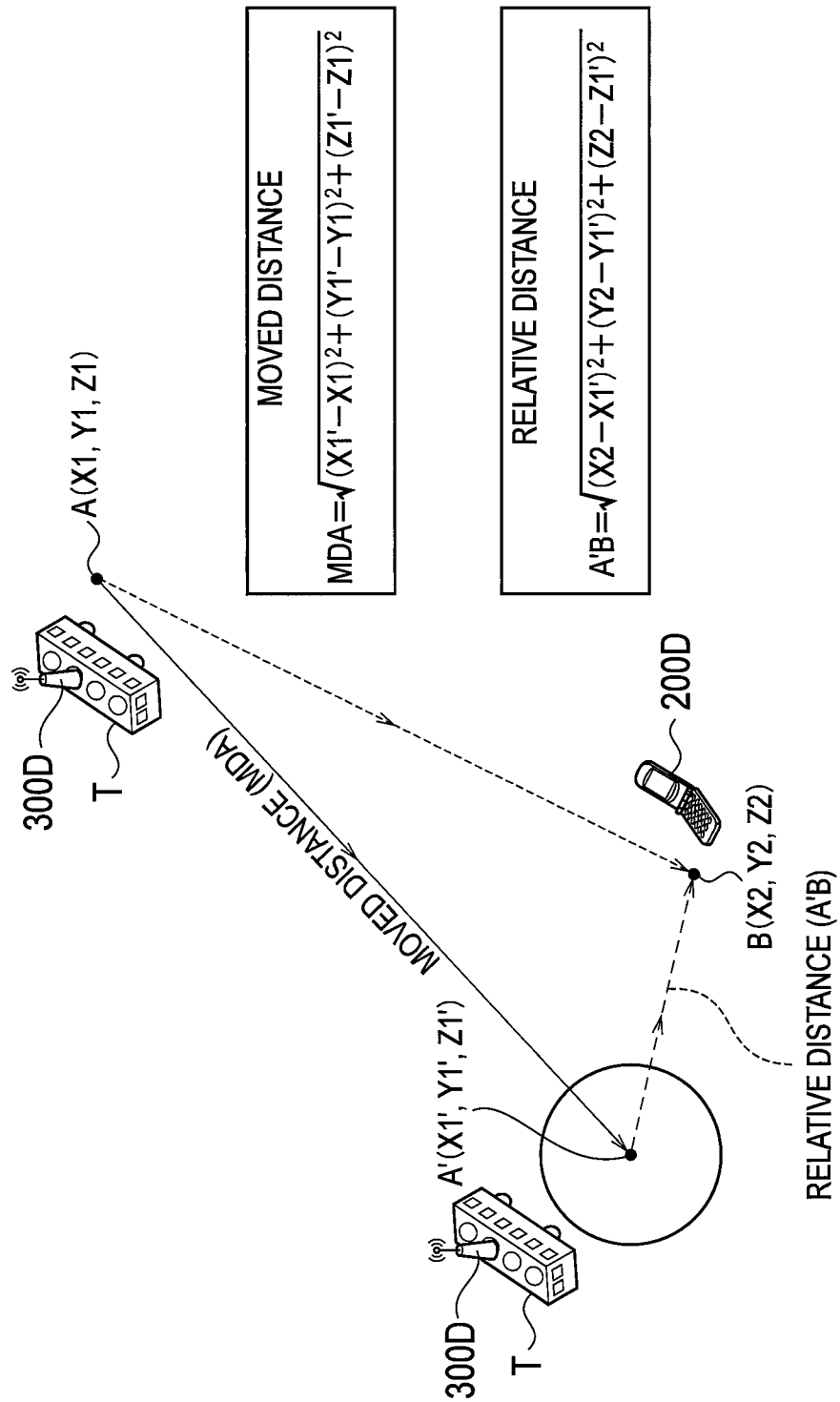
FIG. 17 is the diagram for explaining a handover control operation 1 according to the third embodiment of the present invention.

FIG. 17 is a diagram for explaining the handover control operation 1 according to the third embodiment.

First of all, the information acquisition unit 521 acquires the location information A (X1, Y1, Z1) of the relay node 300D in a first time when the level of the radio quality between the radio terminal 200D and the relay node 300D is in a state where the radio terminal 200D can connect to the relay node 300D. The state where the radio terminal 200D can connect to the relay node 300D implies, for example, a state where the level of the radio quality between the radio terminal 200D and the relay node 300D is better than the level of the radio quality between the radio terminal 200D and the radio base station 100D.

In a second time after the lapse of a predetermined time period from the first time, the information acquisition unit 521 acquires the location information A' (X1', Y1', Z1') of the relay node 300D, and also the location information B (X2, Y2, Z2) of the radio terminal 200D.

The moved-distance calculator 522 calculates the distance between A and A' as the moved distance of the relay node 300D (MDA) by using the calculation equation described in FIG. 17.

When the moved distance of the relay node 300D (MDA) is more than zero, the relative distance calculator 523 calculates the relative distance between A' and B (RD) in the second time by using the calculation equation described in FIG. 17. Here, the present embodiment is different from the first embodiment in that the relative distance between the radio terminal 200D and the relay node 300D in the first time is considered as zero. That is, because the transmission power of the relay node 300D is small, it can be assumed that the radio terminal 200D is positioned in the proximity of the relay node 300D when the radio terminal 200D can be connected to the relay node 300D. Thus, the relative distance between the radio terminal 200D and the relay node 300D in the first time can be considered to be zero.

The relative distance between A' and B (RD), which is calculated by the relative distance calculator 523, corresponds to the first value indicating the amount of change in the relative distance between the radio terminal 200D and the relay node 300D over a predetermined time period (from the first time to the second time).

When the relative distance between A' and B (RD) is equal to or less than a threshold value, the handover decision unit 524 decides that a handover from the radio base station 100D to the relay node 300D by the radio terminal 200D is allowed (acknowledged), and transmits the decision result (handover Ack) indicating the same from the transceiver unit 510 to the radio base station 100D. The threshold value is a value corresponding to a predetermined distance from the relay node 300D (for example, the range within the transportation equipment T) as shown in the circle with the relay node 300D as the center in FIG. 17. When the handover controller 124 of the radio base station 100D receives the handover Ack, the handover controller 124 instructs the radio terminal 200D to perform a handover to the relay node 300D.

Note that when the moved distance of the relay node 300D (MDA) is zero, the information acquisition unit 521 acquires the location information A" (X1", Y1", Z1") of the relay node 300D in a third time after the further lapse of a predetermined time period from the second time. Thus, when the moved distance of the relay node 300D (MDA) is zero, the information acquisition unit 521 repeats the acquisition of the location information of the relay node 300D only a predetermined number of times.

By thus performing a handover control, same as the first embodiment, it is possible to perform a handover to the relay node 300D when the radio terminal 200D exists in the transportation equipment T, and to not perform a handover to the relay node 300D when the radio terminal 200D does not exist in the transportation equipment T.

(2.1.2) Handover Control Operation 2

Figure 18:
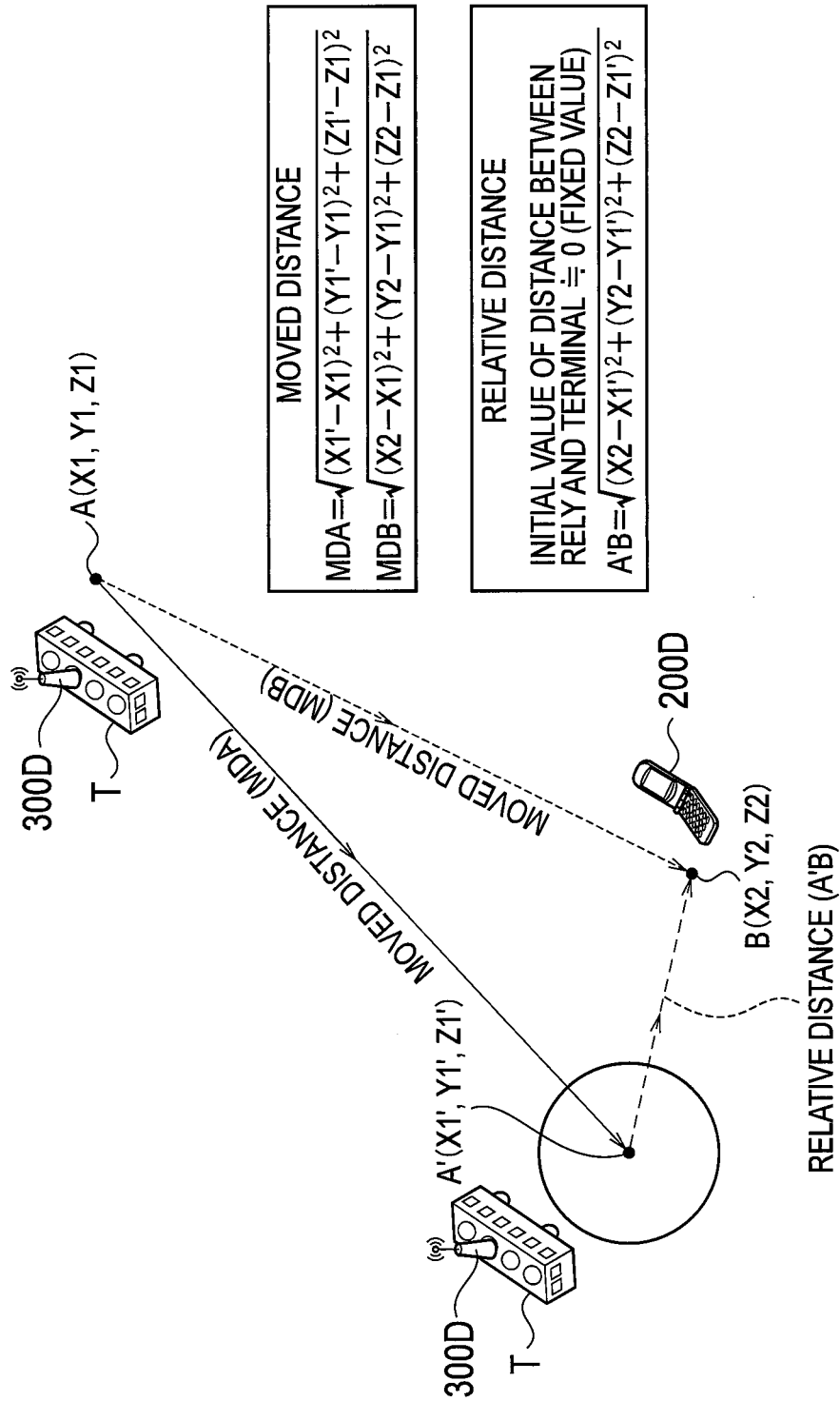
FIG. 18 is a diagram for explaining a handover control operation 2 according to the third embodiment of the present invention.

FIG. 18 is a diagram for explaining the handover control operation 2 according to the third embodiment.

First of all, the information acquisition unit 521 acquires the location information A (X1, Y1, Z1) of the relay node 300D in a first time when the level of the radio quality between the radio terminal 200D and the relay node 300D is in a state where the radio terminal 200D can connect to the relay node 300D. The state where the radio terminal 200D can connect to the relay node 300D implies, for example, a state where the level of the radio quality between the radio terminal 200D and the relay node 300D is better than the level of the radio quality between the radio terminal 200D and the radio base station 100D.

In a second time after the lapse of a predetermined time period from the first time, the information acquisition unit 521 acquires the location information A' (X1', Y1', Z1') of the relay node 300D, and also the location information B (X2, Y2, Z2) of the radio terminal 200D.

By using the calculation equation described in FIG. 18, the moved-distance calculator 522 calculates the distance between A and A' as the moved distance of the relay node 300D (MDA), and calculates the distance between A and B as the moved distance of the radio terminal 200D (MDB). Here, the present embodiment is different from the first embodiment in that the relative distance between the radio terminal 200D and the relay node 300D in the first time is considered as zero, and the location of the radio terminal 200D in the first time is considered to be same as the location of the relay node 300D. That is, because the transmission power of the relay node 300D is small, it can be assumed that the radio terminal 200D is positioned in the proximity of the relay node 300D when the radio terminal 200D can be connected to the relay node 300D. Thus, the relative distance between the radio terminal 200D and the relay node 300D in the first time can be considered to be zero.

When at least one of the moved distance of the relay node 300D (MDA) or the moved distance of the radio terminal 200D (MDB) is more than zero, the relative distance calculator 523 calculates the relative distance between A' and B (RD) in the second time by using the calculation equation described in FIG. 18. Because the relative distance between the radio terminal 200D and the relay node 300D in the first time is considered as zero, the relative distance between A' and B (RD), which is calculated by the relative distance calculator 523, corresponds to the first value indicating the amount of change in the relative distance between the radio terminal 200D and the relay node 300D over a predetermined time period (from the first time to the second time).

When the relative distance between A' and B (RD) is equal to or less than a threshold value, the handover decision unit 524 decides that a handover from the radio base station 100D to the relay node 300D by the radio terminal 200D is allowed (acknowledged), and transmits the decision result (handover Ack) indicating the same from the transceiver unit 510 to the radio base station 100D. The threshold value is a value corresponding to a predetermined distance from the relay node 300D (for example, the range within the transportation equipment T) as shown in the circle with the relay node 300D as the center in FIG. 18. When the handover controller 124 of the radio base station 100D receives the handover Ack, the handover controller 124 instructs the radio terminal 200D to perform a handover to the relay node 300D.

Note that when the moved distance of the relay node 300D (MDA) and the moved distance of the radio terminal 200D (MDB) are zero, the information acquisition unit 521 acquires the location information A" (X1", Y1", Z1") of the relay node 300D and the location information B' (X2', Y2', Z2') of the radio terminal 200D in a third time after the further lapse of a predetermined time period from the second time. In this way, the information acquisition unit 521 repeats the acquisition of the location information of the relay node 300D and the radio terminal 200D for the predetermined number of times, when the moved distance (MDA) of the relay node 300D and the moved distance (MDB) of the radio terminal 200D are zero.

By thus performing a handover control, same as the first embodiment, it is possible to perform a handover to the relay node 300D when the radio terminal 200D exists in the transportation equipment T, and to not perform a handover to the relay node 300D when the radio terminal 200D does not exist in the transportation equipment T.

(2.2) Detailed Operation Example of Radio Communication System

FIG. 19 is an operation sequence chart illustrating a detailed operation example of the radio communication system 1 according to the third embodiment.

In step S401, the radio base station 100D transmits Measurement Control, which is a message for controlling the measurement of the radio quality in the radio terminal 200D, to the radio terminal 200D.

In step S402, the radio base station 100D transmits and receives the packet data to and from the radio terminal 200D. In step S403, the radio base station 100D transmits and receives the packet data to and from the relay node 300D.

In step S404, if required, the radio base station 100D assigns a resource to enable the radio terminal 200D to notify the measurement results to the radio base station 100D, and transmits a measurement request requesting a report of the measurement results of the radio quality to the radio terminal 200D.

In step S405, in accordance with the measurement request from the radio base station 100D, the radio terminal 200D notifies the measurement results to the radio base station 100D. The radio terminal 200D notifies its own radio state to the radio base station 100D either periodically, or whenever a specific event (such as when the radio quality between the radio terminal and the connecting radio base station 100D falls below a predetermined value) occurs.

In step S406, the radio base station 100D decides that a handover of the radio terminal 200D is necessary, and then in step S407, the radio base station 100D transmits a handover request message to the relay node 300D. Note that when it can be determined that the relay node 300D is the handover target in the radio base station 100D, rather than transmitting a handover request message to the relay node 300D, a decision request message requesting the decision of a handover may be transmitted to the mobility management device 500.

In step S407a, when a handover request message from the radio base station 100D arrives, the relay node 300D transmits a decision request message to the mobility management device 500 such that the core network 700 can decide a handover. Because the relay node 300D always passes through the radio base station 100D when connecting to the core network 700, the radio base station 100D can confirm if a decision request message has been transmitted to the mobility management device 500.

In step S408, the radio base station 100D stops the timer concerning the handover when the decision request message to the mobility management device 500 passes through the radio base station 100D. After the lapse of a predetermined time period, the radio base station 100D performs the process for enabling the measurement request of the radio quality in the radio terminal 200D (described later in step S422 and S423).

In step S409, the mobility management device 500 receives the decision request message. In step S410, the mobility management device 500 transmits a location information request message requesting the location information of the relay node 300D to the location information server 600.

In step S411 and S412, the location information server 600 measures the location information of the relay node 300D in accordance with the location information request message. In step S413, the location information server 600 transmits the measurement results of the location information to the mobility management device 500.

In step S414, the mobility management device 500 maintains the location information of the relay node 300D. In step S415, the mobility management device 500 awaits the lapse of a predetermined interval. In step S416, the mobility management device 500 transmits a location information request message requesting the location information of each of the relay node 300D and the radio terminal 200D to the location information server 600.

In steps S417 through S419, the location information server 600 that receives the location information request message measures the location information of each of the relay node 300D and the radio terminal 200D. In step S420, the location information server 600 transmits the measurement results of the location information to the mobility management device 500.

Note that the time period from the time a notification of the location information from the location information server 600 first reaches the mobility management device 500 (step S413) up to the time a notification of the location information reaches next (step S420) is the predetermined time period.

In step S421, the mobility management device 500 calculates the moved distance according to the aforementioned handover control operations 1 and 2. As for the handover control operation 1, when the moved distance of the relay node 300D is zero, the process returns to step S414, and steps S414 through S420 are repeated. As for the handover control operation 2, when the moved distance of each of the radio terminal 200D and the relay node 300D is zero, the process returns to step S414, and steps S414 through S420 are repeated. However, the number of times the mobility management device 500 can repeat this process is limited, and this frequency is a predetermined number of times.

After the lapse of the predetermined number of times, or after the re-notification of the location information, if the mobility management device 500 determines that the moved distance of the relay node 300D is not zero in the handover control operation 1, the mobility management device 500 calculates the relative distance from the location information of each of the radio terminal 200D and the relay node 300D. As for the handover control operation 2, if the moved distance of each of the radio terminal 200D and the relay node 300D is not zero, the mobility management device 500 calculates the relative distance from the location information of each of the radio terminal 200D and the relay node 300D.

When the calculated relative distance is equal to or less than a threshold value, the mobility management device 500 determines that a handover from the radio base station 100D to the relay node 300D by the radio terminal 200D is allowed (acknowledged), and when it is determined that the calculated relative distance is equal to or more than the threshold value, the mobility management device 500 determines that a handover from the radio base station 100D to the relay node 300D by the radio terminal 200D is denied (negated).

In step S421, the mobility management device 500 transmits the information about the determination results to the radio base station 100D.

On the other hand, in step S422, the radio base station 100D assigns a resource to enable the radio terminal 200D to notify the measurement results of the radio quality to the radio base station 100D. In step S423, in accordance with a command from the radio base station 100D, the radio terminal 200D notifies the measurement results of the radio quality to the radio base station 100D. The measurement results include the information about the radio quality between the radio terminal 200D and the relay node 300D.

In step S425, the radio base station 100D determines whether or not to perform a handover from the radio base station 100D to the relay node 300D by the radio terminal 200D based on the information about the decision result received from the mobility management device 500 in step S424 and the measurement results received from the radio terminal 200D in step S423. Here, if the decision result of a handover by the mobility management device 500 is allowed (acknowledged), and the radio quality between the radio terminal 200D and the relay node 300D is excellent, the radio base station 100D determines that a handover from the radio base station 100D to the relay node 300D by the radio terminal 200D is to be executed. If it is determined that a handover is to be executed, the possibility of acceptance by the relay node 300D is checked, following which a command for a handover to the relay node 300D is transmitted to the radio terminal 200D.

(3) Operation and Effect of Third Embodiment

As described above, according to the third embodiment, when the handover target is the relay node 300D, then by assuming that the relative distance between the radio terminal 200D and the relay node 300D does not exist (is zero), the method of measuring the location information of the radio terminal 200D at the point when a handover request is made can be skipped, and thus, the calculations concerning a handover can be reduced.

According to the handover control operation 1 of the third embodiment, when the relay node 300D moves, by controlling the handover to the relay node 300D based on the relative distance between the relay node 300D and the radio terminal 200D at a location after the lapse of a predetermined time period in the relay node 300D, the process of calculating the moved distance of the radio terminal 200D can be reduced.

By performing the measurement of the location information in the core network 700 (specifically, the location information server 600), the third embodiment can also be applied in a case where a system, such as GPS, which can measure the location information individually in the radio terminal 200D does not exist, and at the same time, the control signals between the radio terminal 200D—the radio base station 100D—the core network 700 can be reduced, and the traffic load can be cut down.

Other Embodiments

Thus, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiment, a radio communication system based on LTE-Advanced has been provided as an example; however, the present invention is applicable not only to the LTE-Advance but also to any radio communication system in which a radio relay station is used. For example, radio communication systems in which a radio terminal has a determination right of a handover also exist. In such radio communication systems, the handover controller 124 provided in the radio base station 100A, the radio base station 100B, and the radio base station 100C may be provided on the radio terminal side (that is, the radio terminal 200A, the radio terminal 200B, and the radio terminal 200C).

The aforementioned first embodiment, second embodiment, and third embodiment can be performed individually, and the first embodiment, the second embodiment, and the third embodiment can also be combined appropriately.

For example, each of the handover control operations 1 and 2 according to the third embodiment can be applied to the system configuration of the first embodiment. That is, the information acquisition unit 121, the moved-distance calculator 122, and the relative distance calculator 123 of the radio base station 100A according to the first embodiment may execute each of the handover control operations 1 and 2 according to the third embodiment. As compared to the handover control operation according to the first embodiment, the acquisition of the location information can be skipped in each of the handover control operations 1 and 2 according to the third embodiment, and therefore, the traffic load between the terminal and the base station can be reduced.

Similarly, the handover control operation explained in the first embodiment can be applied to the system configuration of the third embodiment. That is, the information acquisition unit 521, the moved-distance calculator 522, and the relative distance calculator 523 of the mobility management device 500 according to the third embodiment may execute the handover control operation explained in the first embodiment.

Thus, it must be understood that the present invention includes various embodiments that are not described herein. Therefore, the present invention is limited only by the specific features of the invention in the scope of the claims reasonably evident from the disclosure above.

Note that the entire contents of Japanese Patent Application No. 2009-210464 (filed on Sep. 11, 2009) and Japanese Patent Application No. 2010-014707 (filed on Jan. 26, 2010) are incorporated in the present specification by reference.

INDUSTRIAL APPLICABILITY

As described above, the radio communication system, the radio base station, and the handover control method according to the present invention are useful in radio communication such as mobile communication, when a radio relay station is used, because the occurrence of a process load and communication delay due to a useless handover can be prevented.

The invention claimed is:

1. A radio base station to which a radio terminal and a radio relay station are connected, at least one of the radio terminal and the radio relay station is movable, the radio base station comprising:
   a handover controller configured to control a handover which is an operation in which the radio terminal switches a connection destination, wherein
   the handover controller controls the handover from the radio base station to the radio relay station based on whether or not a predetermined condition is satisfied, wherein the predetermined condition indicates that a state where a change in a relative distance between the radio terminal and the radio relay station either does not exist or is small is maintained,
   the predetermined condition is a condition where a first value indicating an amount of change in the relative distance over a predetermined time period is equal to or less than a threshold value,
   an acquisition unit configured to acquire first terminal location information indicating a location of the radio terminal at the first time; second terminal location information indicating a location of the radio terminal at the second time; first relay station location information indicating a location of the radio relay station at the first time; and second relay station location information indicating a location of the radio relay station at the second time, and a first calculator configured to calculate the first relative distance based on the first terminal location information and the first relay station location information and the second relative distance based on the second terminal location information and the second relay station location information, and to calculate a value indicating a difference between the calculated first relative distance and the calculated second relative distance as the first value.

2. The radio base station according to claim 1, wherein the handover controller controls such that the radio terminal executes the handover from the radio base station to the radio relay station when the predetermined condition is satisfied.

3. The radio base station according to claim 1, wherein the handover controller controls such that the radio terminal executes the handover from the radio base station to the radio relay station when a level of a radio quality between the radio terminal and the radio relay station is higher than a predetermined level and the predetermined condition is satisfied.

4. The radio base station according to claim 1, wherein the handover controller controls such that the radio terminal does not execute the handover from the radio base station to the radio relay station when the predetermined condition is not satisfied.

5. The radio base station according to claim 1, wherein the handover controller controls such that the handover from the radio base station to the radio relay station is not executed when a level of a radio quality between the radio terminal and the radio relay station is higher than a predetermined level, but the predetermined condition is not satisfied.

6. The base station system according to claim 1, further comprising:
   a second calculator configured to calculate a second value indicating a moved distance of the radio terminal over the predetermined time period based on the first terminal location information and the second terminal location information, and to calculate a third value indicating a moved distance of the radio relay station over the predetermined time period based on the first relay station location information and the second relay station location information, wherein
   the first calculator calculates the first value when at least one of the second value and the third value is more than zero.

7. The radio base station according to claim 1, further comprising:
   an acquisition unit configured to acquire terminal location information indicating a location of the radio terminal at the second time after the lapse of the predetermined time period from the first time when a level of the radio quality between the radio terminal and the radio relay station is in a state where the radio terminal can connect to the radio relay station, and relay station location information indicating a location of the radio relay station at the second time, and
   a first calculator configured to calculate a relative distance between a location shown by the terminal location information and a location shown by the relay station location information as the first value by assuming that the relative distance between the radio terminal and the radio relay station at the first time is zero.

8. The radio base station according to claim 7, further comprising:
   a second calculator configured to calculate a value indicating a moved-distance of the radio relay station over the predetermined time period based on the first relay station location information indicating a location of the radio relay station at the first time and the second relay station location information indicating a location of the radio relay station at the second time, wherein the first calculator calculates the first value when the value calculated by the second calculator is more than zero.

9. A handover control method for controlling a handover that is an operation in which a radio terminal switches connection destinations, in a radio communication system configured such that a radio terminal and a radio relay station are connected to a radio base station and at least one of the radio terminal and the radio relay station is movable, the handover control method comprising:

a step of controlling, by the radio base station, the handover from the radio base station to the radio relay station based on whether or not a predetermined condition is satisfied, wherein the predetermined condition indicates that a state where a change in a relative distance between the radio terminal and the radio relay station either does not exist or is small is maintained, wherein the predetermined condition is a condition where a first value indicating an amount of change in the relative distance over a predetermined time period is equal to or less than a threshold value, an acquisition unit configured to acquire first terminal location information indicating a location of the radio terminal at the first time; second terminal location information indicating a location of the radio terminal at the second time; first relay station location information indicating a location of the radio relay station at the first time; and second relay station location information indicating a location of the radio relay station at the second time, and a first calculator configured to calculate the first relative distance based on the first terminal location information and the first relay station location information and the second relative distance based on the second terminal location information and the second relay station location information, and to calculate a value indicating a difference between the calculated first relative distance and the calculated second relative distance as the first value.

* * * * *